(12) United States Patent
Yoshioka

(10) Patent No.: US 8,072,434 B2
(45) Date of Patent: Dec. 6, 2011

(54) APPARATUS AND METHOD FOR INFORMATION PROCESSING AND STORAGE MEDIUM THEREFOR

(75) Inventor: Teruyuki Yoshioka, Kyoto (JP)

(73) Assignee: Nintendo Co., Ltd., Kyoto-Shi, Kyoto (JP)

( * ) Notice: Subject to any disclaimer, the term of this patent is extended or adjusted under 35 U.S.C. 154(b) by 930 days.

(21) Appl. No.: 12/073,850

(22) Filed: Mar. 11, 2008

(65) Prior Publication Data

US 2008/0224999 A1 Sep. 18, 2008

(30) Foreign Application Priority Data

Mar. 13, 2007 (JP) ................................ 2007-063589

(51) Int. Cl.
*G06F 3/041* (2006.01)
(52) U.S. Cl. ........................................ 345/173; 345/179
(58) Field of Classification Search .................. 715/810, 715/835, 840, 864; 345/173, 179
See application file for complete search history.

(56) References Cited

U.S. PATENT DOCUMENTS 7,549,924 B2 * 6/2009 Canessa et al. ................. 463/42
2006/0112353 A1 * 5/2006 Okamoto et al. ............. 715/810

FOREIGN PATENT DOCUMENTS

EP 1 645 949 4/2006
EP 1 720 316 11/2006

* cited by examiner

*Primary Examiner* — Kevin M Nguyen
*Assistant Examiner* — Sepideh Ghafari
(74) *Attorney, Agent, or Firm* — Nixon & Vanderhye P.C.

(57) ABSTRACT

In a game apparatus, when a user name input mode is selected on a screen displayed with a mode selecting software input region, a user name inputting software input region (including a software keyboard area, and an SW button (decision) and an SW button (cancel) which are formed at positions other than a position of the software keyboard area) is set on a displaying portion. When the SW button (decision) or the SW button (cancel) is touched, a process just as an HW button (A) or an HW button (B) is operated is executed. When a cursor is moved by an HW button (cross) in order to designate or select any one of the SW buttons within the software keyboard area, a combined mode is established to form a user name inputting software input region (an expanded software keyboard area, and an SW button (input) and an SW button (erase) which are formed at positions other than a position of the expanded software keyboard area) on the displaying portion. At this time, within the expanded software keyboard area, the SW button (decision) and the SW button (cancel) are set.

19 Claims, 9 Drawing Sheets

(A)

(B)

APPARATUS AND METHOD FOR INFORMATION PROCESSING AND STORAGE MEDIUM THEREFOR

CROSS REFERENCE OF RELATED APPLICATION

The disclosure of Japanese Patent Application No. 2007-63589 is incorporated herein by reference.

BACKGROUND OF THE INVENTION

1. Field of the Invention

The invention relates to an apparatus and a method for information processing and a storage medium therefor. More specifically, the present invention relates to an information processing apparatus and a program therefor capable of inputting predetermined data (user name, etc.) by utilizing keys or buttons at a hardware (hereinafter, referred to as "HW") input portion such as a pushbutton switch, a direction key, a joystick, etc. or keys or buttons at a software (hereinafter, referred to as "SW") input portion which is displayed on a display device.

2. Description of the Related Art

As one example of such kind of information processing apparatus, there is a game apparatus with touch panel, like NINTENDO DS (product name). In a game apparatus of this kind, for example, as explained in a reference (NINTENDO DS product instructions (released on December, 2004)), by a selection on a menu screen, a mode selecting software input region 1 is displayed on a displaying portion, and within the mode selecting software input region 1, four SW buttons 2a, 2b, 2c and 2d, an SW button (decision) 3, and an SW button (cancel) 4 are displayed. On the mode selecting screen 1, by touching any one of an option setting function actuating button 2a, a date and time setting function actuating button 2b, a user information setting function activating button 2c and a touch screen setting function actuating button 2d with a touch pen (stylus pen: not illustrated) or the like, a user can activate each function (an option setting function, a date and time setting function, etc.). Furthermore, on the mode selecting screen 1, by an operation of an HW button (cross) to thereby move a cursor left and right, any one of the SW buttons 2a-2d can be selected with the cursor, and by a touch of the SW button (decision) 3 or by an operation of an HW button (A), a function corresponding to the SW button cursor-selected at that time can be then activated.

When the option setting function is activated, a language selecting software input region 5 shown in FIG. 2 for setting a language to be used on the game screen is set to the displaying portion. In the language selecting software input region 5, by touching an SW button indicating a desired language (Japanese, English, etc.), the corresponding SW button can be selected with the cursor. Also, by an operation of the HW button (cross) to thereby move the cursor, any one of the SW buttons can be selected. Then, by a touch of the SW button (decision) 3, a selection of the language corresponding to the SW button currently cursor-selected is decided (the language is set), or by a touch of the SW button (cancel) 4, the displaying portion can be returned to the mode selecting screen 1 without the current language setting being changed.

Furthermore, when the date and time setting function is activated, a time setting software input region 6 for setting a time shown in FIG. 3 is displayed. In the time setting software input region 6, by a touch of an up arrow key or a down arrow key with respect to each of "hour" and "minute", a desired value can be set to each of the "hour" and "minute". Then, by a touch of the SW button (decision) 3, the set values can be decided, or by a touch of the SW button (cancel) 4, the displaying portion can be returned to the mode selecting screen 1 without the time setting being changed. In addition, by the HW button (cross), the setting of "hour" and "minute" can be changed.

When the user information setting function is activated, that is, when the user name mode is set, a user name inputting software input region 7 for registering a user name shown in FIG. 4, for example, is set on the displaying portion. The user name inputting software input region 7 includes a software keyboard area 8 surrounded by a boldface box in FIG. 4. The software keyboard area 8 includes a portion for inputting a character and a symbol ("a" (Japanese hiragana character) button, etc.; hereinafter called an SW button (character)) and a portion for executing a function (a "kana" (Japanese hiragana character) button, a "katakana" (Japanese katakana character) button, a "←: backspace" button 8a, a "decision" button 8b, a "cancel" button 8c, etc. ; hereinafter called an SW button (function)). The user can input a desired character and symbol, or execute a predetermined function by touching the SW button (character) or the SW button (function) displayed on the software keyboard area 8 with a pen or the like. In a case that the SW button (function) is touched, a touch of the SW button (←: backspace) 8a allows the character and the symbol input immediately before to be erased, a touch of the SW button (decision) key 8b allows the input user name to be decided, and a touch of the SW button (cancel) 8c allows a return to the mode selecting screen 1 without the current user name being changed. In addition, by an operation of the HW button (cross) to thereby move the cursor, any one of the SW button (character) and the SW button (function) within the software keyboard area can be selected. Then, by a touch of the SW button (input) 3', if the SW button (character) is selected with the cursor, the relevant character is input, and if the SW button (function) is selected with the cursor, a predetermined function is executed. Furthermore, by a touch of the SW button (erase) 4', the character and the symbol which are input immediately before can be erased. It should be noted that by the HW button (cross), the SW key (input) 3' and the SW key (erase) 4' cannot be selected with the cursor.

Also, as to the language selecting software input region and the time setting software input region, by an operation of the HW button (A) instead of a touch of the SW button (decision) 3, it is possible to decide a selection, and by an operation of the HW button (B) instead of a touch of the SW button (cancel) 4, it is possible to return to the setting of the mode selecting software input region 1 without the current setting being changed.

On the other hand, in the user name inputting software input region, by an operation of the HW button (A) instead of a touch of the SW button (input) 3, the character corresponding to the SW button (character) currently selected with the cursor can be input, or the function corresponding to the SW button (function) currently selected with the cursor can be executed. Furthermore, by an operation of the HW button (B) instead of a touch of the SW button (erase) 4, the character and the symbol input immediately before can be erased.

As described above, while the process to be executed by an operation of the HW button (A) and the HW button (B) and the process to be executed by a touch of the two SW buttons arranged at the lower part of the screen mean "decision of selection" and "return to the setting of the mode selecting software input region without changing the current setting" in the language selecting software input region and the current time setting software input region, but mean "input of the character which is being currently selected with a cursor (or execution of the function)" and "erasure of the character and the symbol which are input immediately before" in the user name inputting software input region, being short of a unity in sense of an operation.

Furthermore, in the user name inputting software input region, the SW button (SW button (decision) 8b and the SW button (cancel) 8c) for executing processing of "decision of selection", and "return to the setting of the mode selecting software input region without changing the current setting" are added to the software keyboard area anew.

In the related art, in a case that the user name inputting software input region 7 shown in FIG. 4 is set to the displaying portion, the processing to be executed by an operation of the HW button (A) or the HW button (B) and the processing to be executed by a touch of the SW buttons 3' or 4' arranged at the lower part of the screen are changed from the first for the purpose of a character input as described above. Thus, even if the user uses the HW button (A) or the HW button (B) and the two SW buttons 3' or 4' displayed at the lower part of the screen in a state that the user name inputting software input region is displayed, the user cannot decide the input from that time or return to the previous state (mode selecting screen in FIG. 1, for example) just as the language selecting software input region or the time setting software input region is displayed. Furthermore, in a case that the user inputs a user name by utilizing only the touch panel without utilizing the HW button, the functions of the SW buttons at the lower part are changed, so that the positions of the SW buttons and the keys of "character input", "character erase", "decision" and "cancel" are different from those displayed on other screen. Accordingly, in the related art, the functions of the SW button and the HW button are partly changed from one screen to another, causing uncomfortable feeling in operation.

SUMMARY OF THE INVENTION

Therefore, it is a primary object of the present invention to provide a novel information processing apparatus and a program therefor.

Another object of the present invention is to provide an information processing apparatus and a program therefor capable of minimize sense of incongruity in operation of an SW button and an HW button.

The present invention employs following features in order to solve the above-described problems. It should be noted that reference numerals and supplement inside the parentheses show one example of the correspondence with the embodiments described later for easy understanding of the present invention, and does not limit the present invention.

A first invention is an information processing apparatus having a storing portion, a displaying portion, a coordinate inputting portion for inputting coordinates to the displaying portion, and a direction inputting portion comprises an executing means for executing data input processing to cause a user to input predetermined data, and the executing means includes a software input region setting means for setting on the displaying portion a software input region having a plurality of input areas by which a plurality of input data being different from each other are input, a first memory controlling means for accumulatively storing in the storing portion input data corresponding to the input area specified by the input coordinates by detecting an input via the coordinate inputting portion, a deciding means for deciding the input data accumulatively stored in the storing portion as the predetermined data by detecting a first operation by the user, a designating means for designating any one of the plurality of input areas of the software input region by detecting a direction instructing operation by the direction inputting portion, a detecting means for detecting a second operation by the user, and a second memory controlling means for accumulatively storing the input data corresponding to the input area currently designated by the designating means out of the plurality of input areas of the software input region by detecting the first operation after a detection by the detecting means.

In the first invention, an information processing apparatus (10: a reference numeral of the game apparatus, for example, when a corresponding component in the embodiments is designated. This hold true for the later) has a storing portion (42), a displaying portion (14), a coordinate inputting portion (24) for inputting coordinates to the displaying portion, and a direction inputting portion (22a). For example, an activating means including a menu display program (62) in a program memory region (58) executes the program to display a mode selecting software input region (1: FIG. 1). When an activating button for data processing at the mode selecting software input region is selected and decided, an executing means executes the data input processing.

For example, the executing means (34, 60) representatively including a user name input program (64) in the embodiment displays a software input region (7') on a displaying portion (14) by a software input region setting means (34, 42, 60, 78) when the user name input processing is activated. The software input region (7') includes a plurality of input areas, for example, a plurality of SW buttons, each of which is corresponded to input data being different from each other. Accordingly, when input coordinates by the coordinate inputting portion indicates any one of the input areas, input data corresponding to the input areas is input from the software input region (7', 7). A first memory controlling means (S39) accumulatively stores the input data thus input by utilizing the software input region in the storing portion (42, 76). A deciding means (S27, S46) decides the input data stored in the storing portion as predetermined data, for example, user name data in response to a first operation by the user such as an operation of an HW button (A)(22d) or an operation of an SW button (decision)(3). Thus, the decided input data (user name data) is registered in the storing portion (42, 68, 74).

A designating means (S63) designates any one of the plurality of input areas of the software input region by detecting a direction instructing operation by a direction inputting portion (22a). When a second operation like an operation of the direction inputting portion is performed by the user, a detecting means (S89) detects the second operation, and the second memory controlling means (S65, S89, S91) then detects the above-described first operation, the input data input by designating the plurality of input areas of the software input region by the designating means is accumulatively stored in the storing portion (42, 76).

According to the first invention, before a detection of a second operation by the user, when a first operation (an operation of the hardware input portion and an operation of the software input area may be possible) by the user is made, the input data is decided, and after a detection of the second operation, when a first operation by the user is made, the input data corresponding to the input area of the software input region designated by the designating means is accumulatively stored. It should be noted that the second operation is based on the user's intention, and therefore, even if there is a change in the function of the first operation before and after the second operation, less or no uncomfortable feeling occurs.

A second invention is an information processing apparatus which is dependent on a first invention, and further comprises a first pushbutton switch, and the deciding means decides the input data accumulatively stored in the storing portion as the predetermined data by detecting an operation of the first pushbutton switch as the first operation before a detection of the second operation by the detecting means, and the second memory controlling means accumulatively stores the input data corresponding to the input area currently designated by the designating means in the storing portion by detecting the operation of the first pushbutton switch as the first operation after the detection of the second operation by the detecting means.

In the second invention, when the first pushbutton switch (22d) is operated by the user, the deciding means (S27) performs decision processing, and after a detection of the second operation by the detecting means, the second memory controlling means executes memory control processing. According to the second invention, the decision processing or the second memory control processing is performed by an operation of the first push button switch. In other words, the function of the first pushbutton switch is switched before and after the second operation.

A third invention is an information processing apparatus which is dependent on the first invention and further comprises a first addition setting means for setting a first other input area in addition to the software input region on the displaying portion in response to the detection of the second operation, and the deciding means decides the input data accumulatively stored in the storing portion as the predetermined data when the input coordinates by the coordinate inputting portion indicates the first other input area instead of the first operation being detected after the detection by the second operation.

In the third invention, a first addition setting means (S51) sets a first other input area (8b) in addition to the software input region (7') on the displaying portion. Then, when the first other input area is designated by the coordinate inputting portion in stead of the first operation being detected, the deciding means performs decision processing. According to the third invention, after the second operation, the decision processing can be performed by utilizing the first other input area set to the software input region.

A fourth invention is an information processing apparatus which is dependent on the third invention, wherein the designating means designates any one of the plurality of input areas of the software input region and the first other input area by detecting a direction instructing operation by means of the direction inputting portion, and the deciding means decides the input data accumulatively stored as the predetermined data in a case that the first other input area is designated by the designating means when the first operation is detected after a detection by the second operation.

In the fourth invention, by a designation of the first other input area of the software input region by the designating means, the input data can accumulatively be stored.

A fifth invention is an information processing apparatus which is dependent on the first invention, and further comprises a second addition setting means for setting a second other input area in addition to the software input region on the displaying portion, and the deciding means decides the input data accumulatively stored in the storing portion as the predetermined data when a detection of an operation of the first pushbutton switch and a detection of the input coordinates by the coordinate inputting portion indicating the second other input area is performed as a detection of the first operation before detecting the second operation, and any one of the detections is then made, and the second memory controlling means accumulatively stores the input data corresponding to the input area currently designated by the designating means in the storing portion when a detection of an operation of the first pushbutton switch and a detection of the input coordinates by the coordinate inputting portion indicating the second other input area are performed as a detection of the first operation after the detection of the second operation, and any one of the detections is then made.

In the fifth invention, a first pushbutton switch (22d), a second addition setting means (S51) and a display controlling means (S51, 78) are provided, and the second addition setting means additionally sets a second other input area (3, 3') to the software input region. The deciding means executes decision processing when an operation of the first pushbutton switch or an operation of the second other input area is performed, and the second memory controlling means executes a second memory control processing in response to the operation of the first pushbutton switch or the operation of the second other input area.

In the fifth invention, a display controlling means may further be provided such that a display is made on the second other input area showing that deciding processing of the predetermined data is performed, and the display is changed to show that accumulatively storing processing is executed when a detection of the second operation is made.

Furthermore, the designating means may designate the first other input area as well as the plurality of input areas of the software input region in response to a detection of a direction instructing operation by the direction inputting portion. The deciding means may decide the input data accumulatively stored in the storing portion as predetermined data when the first other input area is designated by the designating means in a case that an operation of the first pushbutton switch is made after the detection of the second operation.

A sixth invention is an information processing apparatus which is dependent on a first invention, and further comprises a second pushbutton switch, a first ending means for ending the data input processing mode in response to a detection of an operation of the second pushbutton switch as a third operation before detecting the second operation, and a first erasing means for erasing input data last stored out of the input data accumulatively stored in response to the detection of the operation of the second pushbutton switch as the third operation after the detection of the second operation.

In the sixth invention, a second pushbutton switch (22e) is provided, a first ending means (S29) ends the data input processing during execution when the operation of the second pushbutton switch is detected before the detection of the second operation, and returns to the state immediate before, for example (cancel processing). However, after the second operation, in response to an operation of the second pushbutton switch, an erasing means (S71) erases the last input data out of the input data accumulatively stored in the temporary input area, for example. According to the sixth invention, the function of the second pushbutton switch is changed before and after the detection of the second operation, but the second operation is based on the user's intention, and therefore, the user does not have uncomfortable feeling in operation.

A seventh invention is an information processing apparatus which is dependent on the first invention, and further comprises a third addition setting means for setting a third other input area in addition to the software input region on the displaying portion in response to the detection of the second operation, and the first ending means ends the data input processing mode when the input coordinates by the coordinate inputting portion indicates the third other input area in stead of a detection of the third operation after the detection of the second operation.

In the seventh invention, a third addition setting means (S51) additionally sets a third other input area (8c) to the software input region. Then, the first erasing means executes erasing processing when the third other input area is designated in stead of the detection of the third operation. According to the seventh invention, after the detection of the second operation, the erasing processing can be made by utilizing the software input region.

An eighth invention is an information processing apparatus which is dependent on the seventh invention, and in which the designating means designates any one of the plurality of input areas and the third other input area of the software input region by detecting a direction instructing operation by the direction inputting portion, and the first ending means ends the data input processing mode in a case that the third other input area is designated by the designating means when the first operation is detected after the detection of the second operation.

In the eighth invention, in a case that a designating means (S63) designates the third other input area (8c) when a first operation is detected after the detection of the second operation, the first ending means ends the data input processing mode.

A ninth invention is an information processing apparatus which is dependent on the first invention, and further comprises a second pushbutton switch, a fourth addition setting means for setting a fourth other input area in addition to the software input region on the displaying portion, a second ending means for ending the data input processing when a detection of an operation of the second pushbutton switch and a detection of the input coordinates by the coordinate inputting portion indicating the fourth other input area are performed as the detection of a third operation before detecting the second operation, and any one of the detections is made, and a second erasing means for erasing input data last stored out of the input data accumulatively stored when a detection of the second pushbutton switch and a detection of the input coordinates by the coordinate inputting portion indicating the fourth other input area are performed, and any one of the detections is made.

In the ninth invention, a second pushbutton switch (22e) and a fourth addition setting means (60, 78) for setting a fourth other input area (4, 4') are provided, and a second ending means (S13, S14) executes end processing in response to an operation of the second pushbutton switch or an operation of the fourth other input area. However, after the detection of the second operation, the second erasing means (S71, S91) executes the erasing processing.

In the ninth invention, a display controlling means may further be provided such that a display is made on the fourth other input area showing that the data input processing mode is to be ended, and the display is changed to a display showing that the input data last stored out of the input data accumulatively stored is erased if the second operation is detected.

A tenth invention is an information processing apparatus which is dependent on the first invention, and an executing means can perform any of data input processing selectively activated out of a plurality of data input processing, and further comprising a process selecting means for causing the user to select data input processing to be executed from the plurality of data input processing, and the executing means activates and executes the data input processing selected by the process selecting means by detecting the first operation.

In the tenth invention, a process selecting means (60, 62, S1) sets a mode selecting software input region which is displayed such that a plurality of data input processing can be specified by the user on the displaying portion. The user decides the data input processing desired to be executed at that time by operating the first operation, such as, an operation of the HW button (A) (22d) or an operation of the SW button (decision) (3). The executing means (S3) executes the data input processing relating to the specification in response to the first operation.

An eleventh invention is an information processing apparatus which is dependent on the tenth invention, and in which the executing means decides the predetermined data by detecting the first operation in the plurality of data input processing.

In the eleventh invention, the executing means decides the data in response to the first operation such as an operation of the HW button (A) (22d) or an operation of the SW button (decision) (3).

A twelfth invention is an information processing apparatus which is dependent on the tenth invention, and in which the executing means ends the data input processing during execution and activates the process selecting means by detecting a third operation in the plurality of data input processing.

In the twelfth invention, the executing means (S13, S14) ends the data input processing in response to an operation of the HW button (B) (22e) or an operation of the SW button (cancel) (4), and returns to the preceding process selecting means (cancel processing).

A thirteenth invention is an information processing apparatus having a storing portion, a displaying portion, a coordinate inputting portion for inputting coordinates to the displaying portion, a pushbutton switch, and a direction inputting portion comprises an executing means for executing data input processing to cause a user to input predetermined data, and the executing means includes a software input region setting means for setting on the displaying portion a software input region having a plurality of input areas by which a plurality of input data being different from each other can be input, a first memory controlling means for accumulatively storing in the storing portion input data corresponding to the input area specified by the input coordinates by detecting an input via the coordinate inputting portion, a first deciding means for deciding the input data accumulatively stored in the storing portion as predetermined data by detecting an operation of the pushbutton switch, a designating means for designating any one of the plurality of input areas of the software input region by detecting a direction instructing operation by the direction inputting portion, a second memory controlling means for accumulatively storing the input data corresponding to the input area designated by the designating means by detecting an operation of the pushbutton switch after a detection of the second operation by the user, a first addition setting means for setting a first other input area in addition to the software input region on the displaying portion in response to the detection of the second operation, and a second deciding means for deciding the input data accumulatively stored in the storing portion as the predetermined data when the input coordinates by the coordinate inputting portion indicates the first other input area.

In the thirteenth invention, an information processing apparatus (10) has a storing portion (42), a displaying portion (14), a coordinate inputting portion (24) for inputting coordinates to the displaying portion, a pushbutton switch (22d), and a direction inputting portion (22a). For example, an activating means including a menu display program (62) of a program memory region (58) is executed to display a mode selecting software input region (1: FIG. 1). When an activating button for data processing, for example, is selected at the mode selecting software input region, and a decision operation is performed thereon, an executing means executes the data input processing.

For example, When the user name input processing is activated, the executing means (34, 60) representatively including a user name input program (64) in this embodiment displays a software input region (7') on the displaying portion (14) by the software input region setting means (34, 42, 60, 78). The software input region (7') includes a plurality of input areas, for example, a plurality of SW buttons, each of which is corresponded to allow different data input. Accordingly, when input coordinates by the coordinate inputting portion indicates any one of an input areas, input data corresponding to the input area is input from the software input region (7', 7). Then, a first memory controlling means (S39) accumulatively stores the input data input by thus utilizing the software input region in the storing portion (42, 76). When the pushbutton switch is operated by the user, a first deciding means (S27) decides the input data stored in the storing portion as predetermined data, for example, user name data. Thus, the decided input data (user name data) is registered in the storing portion (42, 68, 74).

A designating means (S63) designates any one of the plurality of input areas of the software input region. After a second operation such as an operation of the direction inputting portion is performed by the user, a second memory means (S65, S89, S91) accumulatively stores the input data input by designating the plurality of input area of the software input region by the designating means in the storing portion (42, 76) when an operation of the pushbutton switch is detected.

Furthermore, a first addition setting means (S51) sets a first other input area (8b) in addition to the software input region (7') on the displaying portion. The second deciding means (S46) decides the input data stored in the storing portion as predetermined data, for example, user name data in response to an operation of the first other input area. Thus, the decided input data (user name data) is registered in the storing portion (42, 68, 74).

According to the thirteenth invention, by either operation of the pushbutton switch or the first other input area, it is possible to decide the input data.

A fourteenth invention is a data input processing method for causing a user to input predetermined data by a computer of an information processing apparatus having a storing portion, a displaying portion, a coordinate inputting portion for inputting coordinates to the displaying portion, and a direction inputting portion includes a software input region setting step for setting on the displaying portion a software input region having a plurality of input areas to which a plurality of input data being different from each other can be input; a first memory controlling step for accumulatively storing in the storing portion input data corresponding to the input area specified by the input coordinates in the plurality of input areas of the software input region by detecting an input by the coordinate inputting portion; a deciding step for deciding the input data accumulatively stored in the storing portion as predetermined data by detecting a first operation by the user; a designating step for designating any one of the plurality of input areas of the software input region by detecting a direction instructing operation by the direction inputting portion, and a second memory controlling step for accumulatively storing input data corresponding to the input area currently designated out of the plurality of input areas of the software input region in the storing portion by detecting a first operation after a second operation by the user.

In also the fourteenth invention, an advantage similar to that in the first invention can be expected.

A fifteenth invention is a storage medium storing a program to causes a computer of an information processing apparatus having a storing portion, a displaying portion, a coordinate inputting portion for inputting coordinates to the displaying portion and a direction inputting portion to execute an executing step for executing data input processing for inputting predetermined data by a user, the executing step includes a software input region setting step for setting on the displaying portion a software input region having a plurality of input areas by which a plurality of input data being different from each other can be input, a first memory controlling step for accumulatively storing in the storing portion input data corresponding to the input area specified by the input coordinates in the plurality of input areas of the software input region by detecting an input by the coordinate inputting portion, a deciding step for deciding the input data accumulatively stored in the storing portion as predetermined data by detecting a first operation by the user, a designating step for designating any one of the plurality of input areas of the software input region by detecting a direction instructing operation by the direction inputting portion, and a second memory controlling step for accumulatively storing input data corresponding to the input area currently designated out of the plurality of input areas of the software input region in the storing portion by detecting a first operation after a second operation by the user.

In the fifteenth invention also, an advantage similar to that in the first invention can be expected.

A sixteenth invention is a data input processing method for causing a user to input predetermined data by a computer of an information processing apparatus having a storing portion, a displaying portion, a coordinate inputting portion for inputting coordinates to the displaying portion, a pushbutton switch, and a direction inputting portion includes: a setting step for setting on the displaying portion a software input region having a plurality of input areas by which a plurality of input data being different from each other can be input; a first memory controlling step for accumulatively storing in the storing portion input data corresponding to the input area specified by the input coordinates by detecting an input via the coordinate inputting portion; a first deciding step for deciding the input data accumulatively stored in the storing portion as predetermined data by detecting an operation of the pushbutton switch; a designating step for designating any one of the plurality of input areas of the software input region by detecting a direction instructing operation by the direction inputting portion; a second memory controlling step for accumulatively storing the input data corresponding to the input area designated by the designating means by detecting an operation of the pushbutton switch after a detection of the second operation by the user; an addition setting step for setting a first other input area in addition to the software input region on the displaying portion in response to the detection of the second operation, and a second deciding step for deciding the input data accumulatively stored in the storing portion as the predetermined data when the input coordinates by the coordinate inputting portion indicates the first other input area.

In the sixteenth invention also, an advantage similar to that in the thirteenth invention can be expected.

According to the present invention, changes in function of the software input region and the hardware input portion are based on the user's intention, capable of feeling no or less sense of incongruity in operation of the SW button and the HW button due to the changes in function.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 9(A) shows the software keyboard area before the change, and FIG. 9(B) is the software keyboard area after the change.

DETAILED DESCRIPTION OF THE PREFERRED EMBODIMENTS

Figure 5:
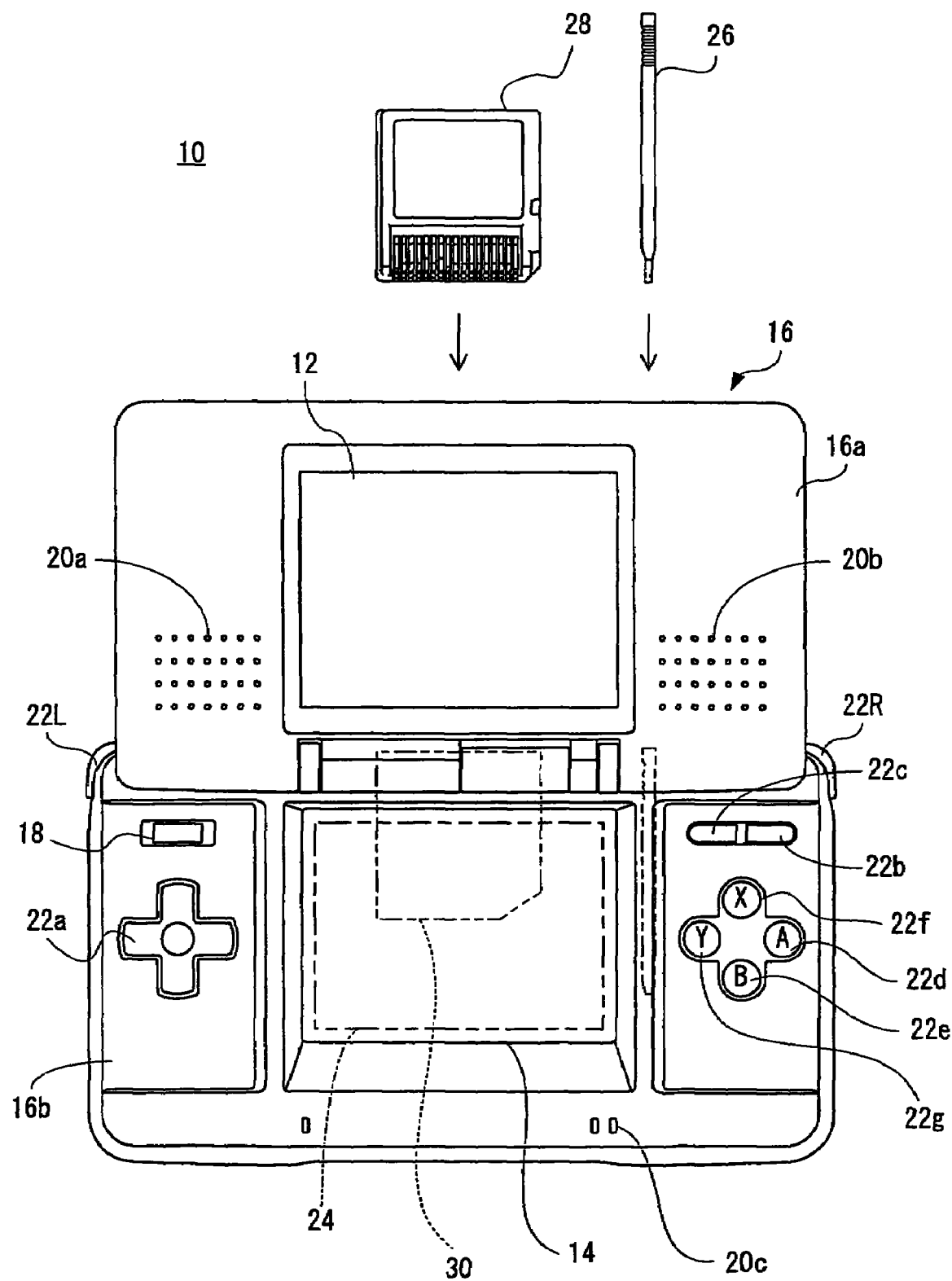
FIG. 5 is an illustrative view showing a game apparatus of one embodiment of an information processing apparatus of the present invention.

A game apparatus 10 of an embodiment of the present invention includes a first liquid crystal display (LCD) 12 and a second LCD 14 with reference to the FIG. 5. The LCD 12 and the LCD 14 are provided on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 5, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Also, on the lower housing 16b, a power switch 18 is provided at the left of the LCD 14.

Furthermore, the upper housing 16a is provided with sound release holes 20a and 20b for speakers 36a and 36b (FIG. 6) on both sides of the LCD 12. The lower housing 16b is provided with a microphone hole 20c for a microphone (not illustrated) and operating buttons 22 (22a, 22b, 22c, 22d, 22e, 22f, 22g, 22L and 22R). The respective operating buttons is HW buttons, and collectively constructs an HW input portion.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The HW input portion 22 includes an HW button (cross) 22a, an HW button (start) 22b, an HW button (select) 22c, an HW button (A) 22d, an HW button (B) 22e, an HW button (X) 22f, an HW button (Y) 22g, an HW button (L) 22L, and an HW button (R) 22R. The HW button (cross) 22a is arranged at the left of the LCD 14 on one surface of the lower housing 16b. Other HW buttons 22b-22g are arranged at the right of the LCD 14 on the one surface of the lower housing 16b. In addition, the HW button (L) 22L and HW button (R) 22R are arranged at the right and left corners sandwiching the connected portion with the upper housing 16a on the upper side surface of the lower housing 16b.

The HW button (cross) 22a functions as a digital joystick, and is utilized for instructing a moving direction of a player character (or player object) to be operated by a user or a player and instructing a moving direction of a cursor, and so forth by operating any one of four depression portions. Also, a specific role can be assigned to each of the four depression portions, and by operating any one of the four depression portions, and it is possible to instruct (designate) the assigned role.

The HW button (start) 22b is formed by a push button, and is utilized for starting (restarting), temporarily stopping (pausing) a game, and so forth. The HW button (select) 22c is formed by the push button, and utilized for a game mode selection, etc.

The HW button (A) 22d, that is, the A button is formed by the push button, and allows the player character to perform an arbitrary action, except for instructing the direction, such as hitting (punching), throwing, holding (obtaining), riding, jumping, etc.

For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The HW button (B) 22e, that is, the B button is formed by the push button, and is utilized for changing a game mode selected by the HW button (select) 22c, canceling an action determined by the HW button (A) 22d, and so forth.

The HW button (X) 22f, that is, the X button and the HW button (Y) 22g, that is, the Y button are formed by the push buttons, and are utilized for a subsidiary operation when the game cannot be advanced only with the HW button (A) 22d and the HW button (B) 22e. Here, the HW button (X) 22f and the HW button (Y) 22g can be used for operations similar to that of the HW button (A) 22d and the HW button (B) 22e. Of course, the HW button (X) 22f and the HW button (Y) 22g are not necessarily used in the game playing.

The HW button (L) (left pushbutton) 22L and the HW button (R) (right pushbutton) 22R are formed by push buttons, can be used for operations similar to the HW button (A)

22*d* and the HW button (B) 22*e*, and can be used for subsidiary operations for the HW button (A) 22*d* and the HW button (B) 22*e*. In addition, the HW button (L) 22L and the HW button (R) 22R can change the functions assigned to the HW button (cross) 22*a*, the HW button (A) 22*d*, the HW button (B) 22*e*, the HW button (X) 22*f*, and the HW button (Y) 22*g* to other functions. In this embodiment, when the HW button (L) 22L is depressed, the code assigned to the HW button (cross) 22*a* is changed to another code.

Also, on a top surface of the LCD 14, a touch panel 24 is provided. As the touch panel 24, any one of kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects a coordinates of an operated position of the stick 26, etc. (that is, touched) to output coordinates data corresponding to the detected coordinates.

It should be noted that in this embodiment, a resolution of the display surface of the LCD 14 (the same is true for the LCD 12) is 256 dots×192 dots, and a detection accuracy of the touch panel 24 is also rendered 256 dots×192 dots in correspondence to the resolution of the display surface. However, the detection accuracy of the touch panel 24 may be lower than or higher than the resolution of the display surface.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Additionally, a game play screen may be displayed on one LCD (LCD 12 in this embodiment), and a game screen (operation screen) including an operation object such as line, diagram, etc. for operating the game can be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point (operate) an image such as a player character, an enemy character, an item character, an operating object, etc. to be displayed on the screen of the LCD 14 and select (input) commands by operating the touch panel 24 with the use of the stick 26, etc. Also, it is possible to change the direction of a virtual camera (viewpoint) provided in the three-dimensional game space, and instruct a scrolling (gradual moving display) direction of the game screen (map).

It should be noted that depending on the kind of the game, other input instructions can be made with the use of the touch panel 24. For example, it is possible to input a coordinates input instruction, and input by hand texts, numbers, symbols, etc. on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

In addition, in this embodiment, the stick 26 can be housed in the housing portion (shown by dotted lines in FIG. 5) provided on the lower housing 16*b*, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading section 30 (shown by dotted lines in FIG. 5) provided on a rear surface or a lower edge (bottom surface) of the lower housing 16*b*. Although omitted in FIG. 5, a connector 32 (see FIG. 6) is provided at a depth portion of the loading section 30 for connecting a connector (not shown) provided at an end portion of the memory card 28 in the loading direction, and when the memory card 28 is loaded into the loading section 30, the connectors are connected with each other, and therefore, the memory card 28 is accessible by a CPU core 34 (see FIG. 6) of the game apparatus 10.

It should be noted that although not illustrated in FIG. 5, the speakers 36*a* and 36*b* (see FIG. 6) are provided at positions corresponding to the sound release holes 20*a* and 20*b* inside the upper housing 16*a*.

Furthermore although omitted in FIG. 5, for example, a battery accommodating box is provided on a rear surface of the lower housing 16*b*, and a volume switch, an external expansion connector, an earphone jack, etc. are provided on a bottom surface of the lower housing 16*b*.

Figure 6:
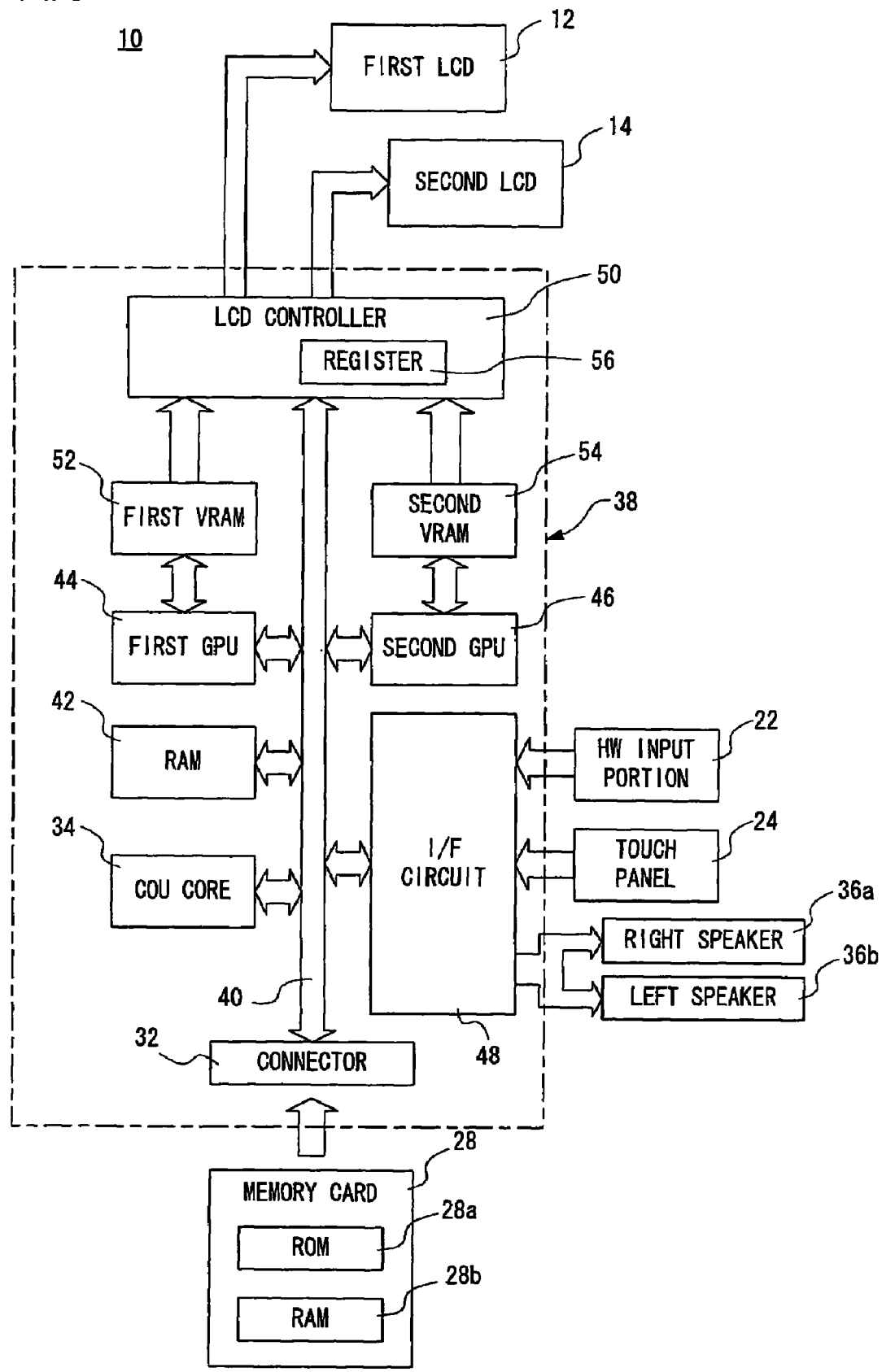
FIG. 6 is a block diagram showing a configuration of the game apparatus in FIG. 5 embodiment.

FIG. 6 is a block diagram showing an electrical configuration of the game apparatus 10. Referring to FIG. 6, the game apparatus 10 includes an electronic circuit board 38, and on the electronic circuit board 38, a circuit component such as a CPU core 34, etc. is mounted. The CPU core 34 is connected to the above-described connectors 32*a* and 32*b* via a bus 40, and is connected with a RAM 42, a first graphics processing unit (GPU) 44, a second GPU 46, an input-output interface circuit (hereinafter, referred to as "I/F circuit") 48, and an LCD controller 50. Here, it is to be understood in advance that the word, "computer", in this specification directly indicates the CPU core 34 of the game apparatus 10 shown in FIG. 6, but may be intended to be used so as to indicate the entire electronic circuit board 38, that is, collectively indicate the above described components 34, and 42-56.

The connector 32 is detachably connected with the memory card 28 as described above. The memory card 28 includes a ROM 28*a* and a RAM 28*b*, and although illustration is omitted, the ROM 28*a* and the RAM 28*b* are connected to each other via a bus and also connected to a connector (not shown) to be connected with the connector 32. Accordingly, the CPU core 34 can gain access to the ROM 28*a* and the RAM 28*b* as described above.

The ROM 28*a* stores in advance a game program for a game to be executed by the game apparatus 10, image data (text and character image, background image, item image, icon (button) image, message image, etc.), data of sound (music) necessary for the game (sound data), etc. The RAM (backup RAM) 28*b* stores (saves) proceeding data of the game, result data of the game, etc.

The RAM 42 is utilized as a buffer memory or a working memory. That is, the CPU core 34 loads the program, the image data, the sound data, etc. stored in the ROM 28*a* of the memory card 28 into the RAM 42, and executes the loaded program. The CPU core 34 executes a game process while storing data (game data, flag data, etc.) generated or obtained in correspondence with a progress of the game in the RAM 42.

It should be noted that the game program, the image data, the sound data, etc. are read from the ROM 28*a* entirely at a time, or partially and sequentially so as to be stored (loaded) into the RAM 42.

However, a program as to other application except for the game and image data required to execute the application may be stored in the ROM 28*a* of the memory card 28. In addition, sound (music) data may be stored therein as necessary. In such a case, the application is executed in the game apparatus 10.

Each of the GPU 44 and the GPU 46 forms a part of a rendering means, is constructed by, for example, a single chip ASIC, and receives a graphics command from the CPU core 34 to generate image data according to the graphics command. Here, the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: character data, texture data, etc.) when the GPU 44 and the GPU 46 executes the rendering command.

Additionally, the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0". Additionally, the LCD controller 50 outputs the image data created by the GPU 44 to the LCD 14, and outputs the image data created by the GPU 46 to the LCD 12 in a case that the data value of the register 56 is "1".

Also, the LCD controller 50 can directly read the image data from the VRAM 52 and the VRAM 54, or read the image data from the VRAM 52 and the VRAM 54 via the GPU 44 and the GPU 46.

The I/F circuit 48 is connected with the HW input portion 22, the touch panel 24 and the speakers 36a, 36b. Here, the HW input portion 22 is the above-described switches 22a, 22b, 22c, 22d, 22e, 22f, 22g, 22L and 22R, and in response to an operation of the HW input portion 22, a corresponding operation signal (operation data) is input to the CPU core 34 via the I/F circuit 48. Furthermore, the coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

Figure 7:
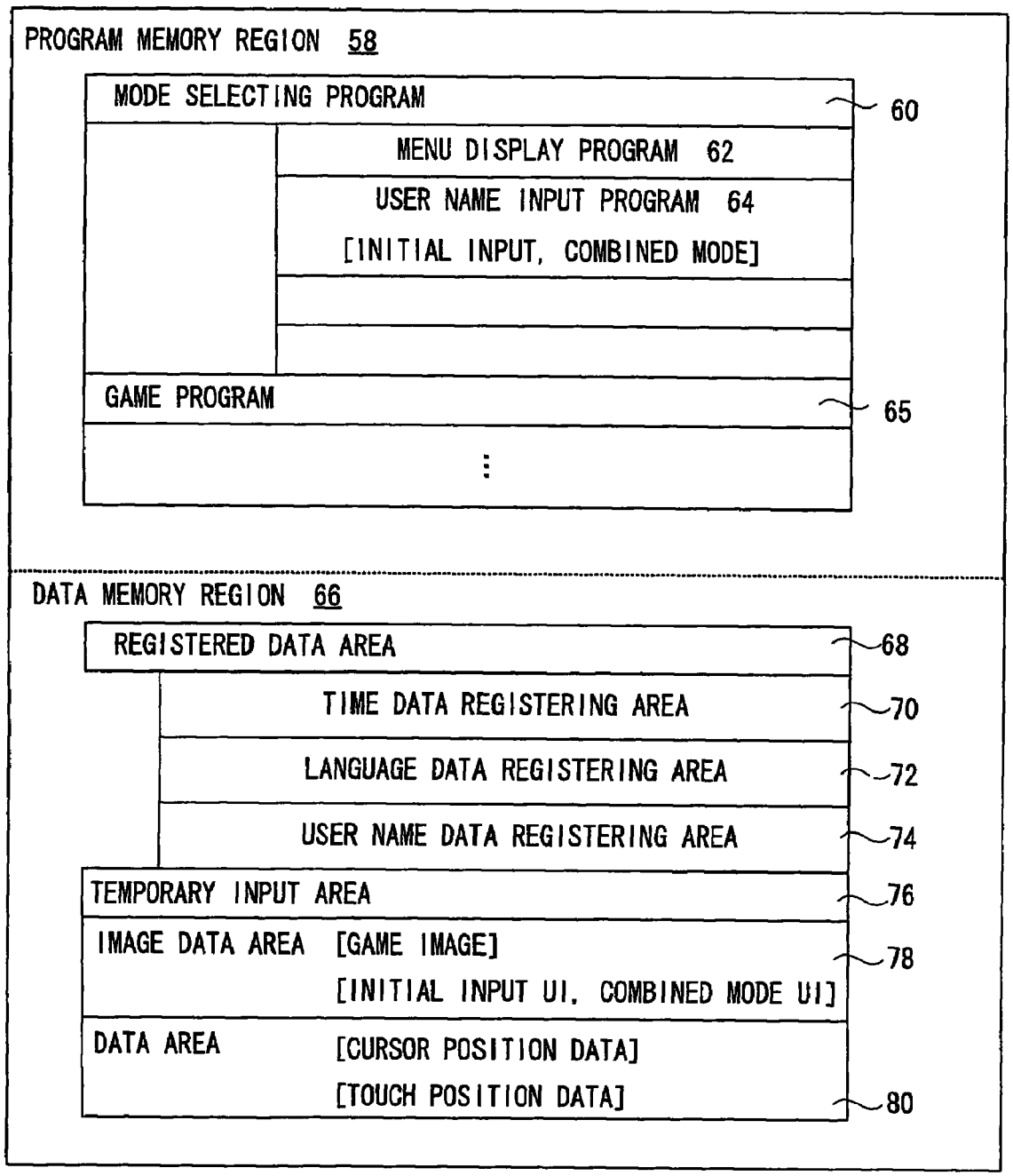
FIG. 7 is an illustrative view showing one example of memory map of a RAM (main memory) contained in the game apparatus in FIG. 5 embodiment.

Referring to FIG. 7, the RAM 42 is formed with a program memory region 58, and the program memory region 58 stores a mode selecting program 60. The mode selecting program 60 is entirely read at a time, or a required part thereof is partially read from an internal ROM (not illustrated) or the foregoing memory card 28 so as to be stored in the program memory region 58.

The mode selecting program 60 typically includes an initial program, such as a menu display program 62, a user name input program 64, etc.

Figure 9:
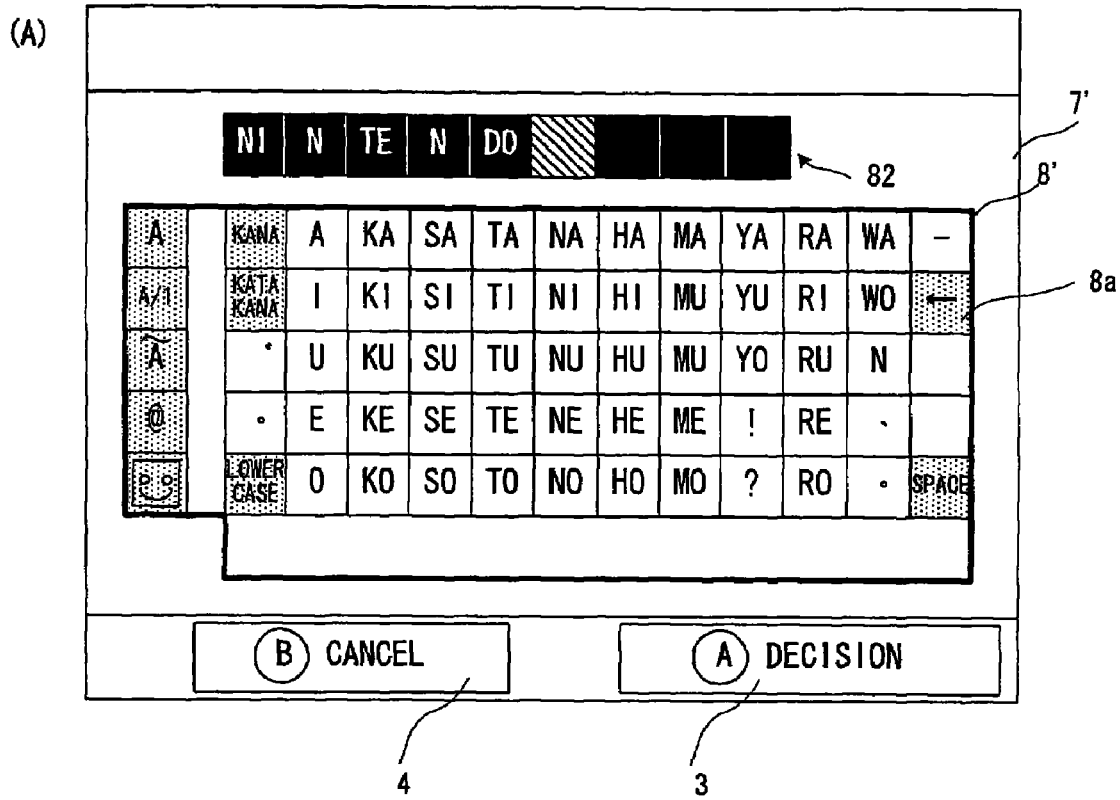
FIG. 9 is an illustrative view showing a software keyboard area to be switched in FIG. 5 embodiment.
Figure 9:
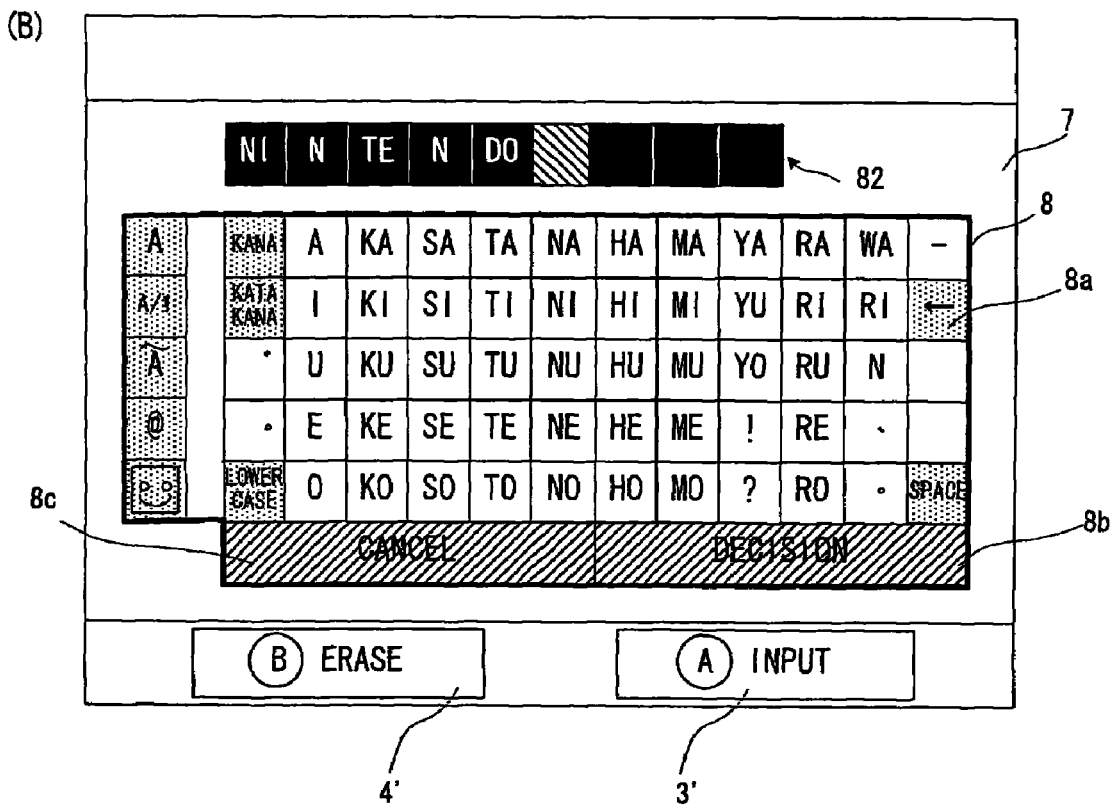

The menu display program 62 is a program for displaying a menu screen (not illustrated) and respective software input regions shown in FIG. 1-FIG. 4. The user name input mode program 64 described later in detail in FIG. 9 is utilized for registering (inputting) a name of a user who uses the game apparatus at a start of using the game apparatus 10. In this case, a combined mode shown in detail in FIG. 10 later can be utilized. Here, the "combined mode" means a mode combining an input by the HW input portion 22 and an input via a touch panel provided with a software input region when characters such as a user name, etc. and symbols are input.

Additionally, the program memory region 58 stores a game program 65 other than the above-described mode selecting program 60. The game program 65 is also read at a time or a necessary part thereof is partially read from the internal ROM (not illustrated) or the foregoing memory card 28 so as to be stored in the program memory region 58. The game program 65 includes a program required to advance the game, but the details are not important in this invention, and therefore, a further explanation will be omitted here.

The RAM 42 is further set with a data memory region 66, and the data memory region 66 is provided with a registered data area 68. The registered data area 68 includes a time data area 70 for registering time data, a language data area 72 for registering language data, and a user name data area 74 for registering user name data.

Figure 2:
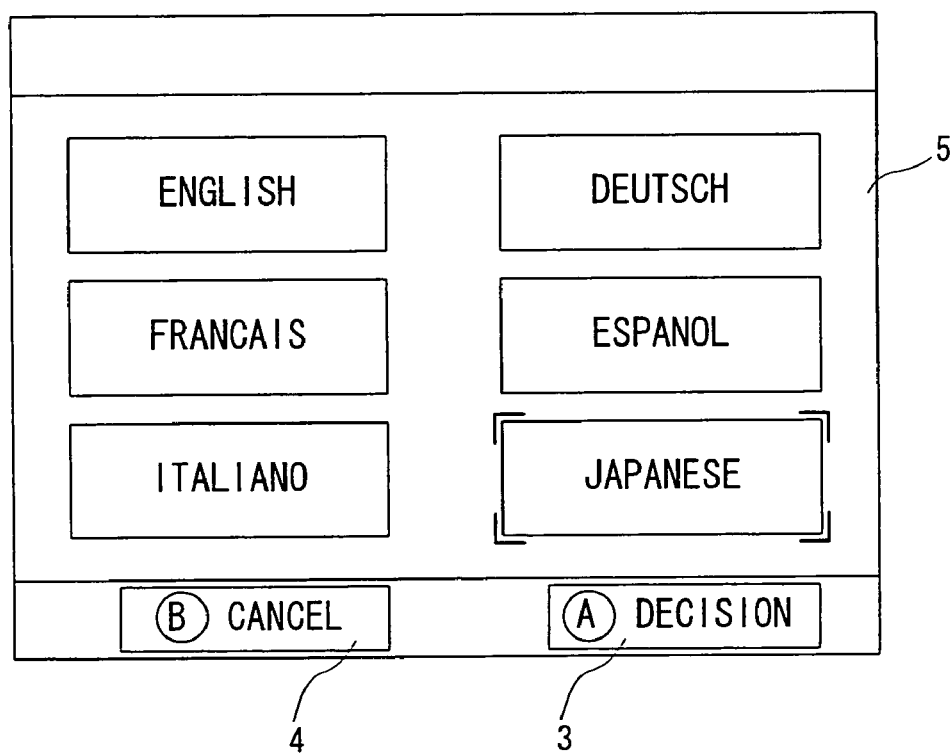
FIG. 2 is an illustrative view showing one example of a language setting screen when an option panel is selected on the mode selecting screen of the related art shown in FIG. 1, and a language setting mode is selected as an option.
Figure 3:
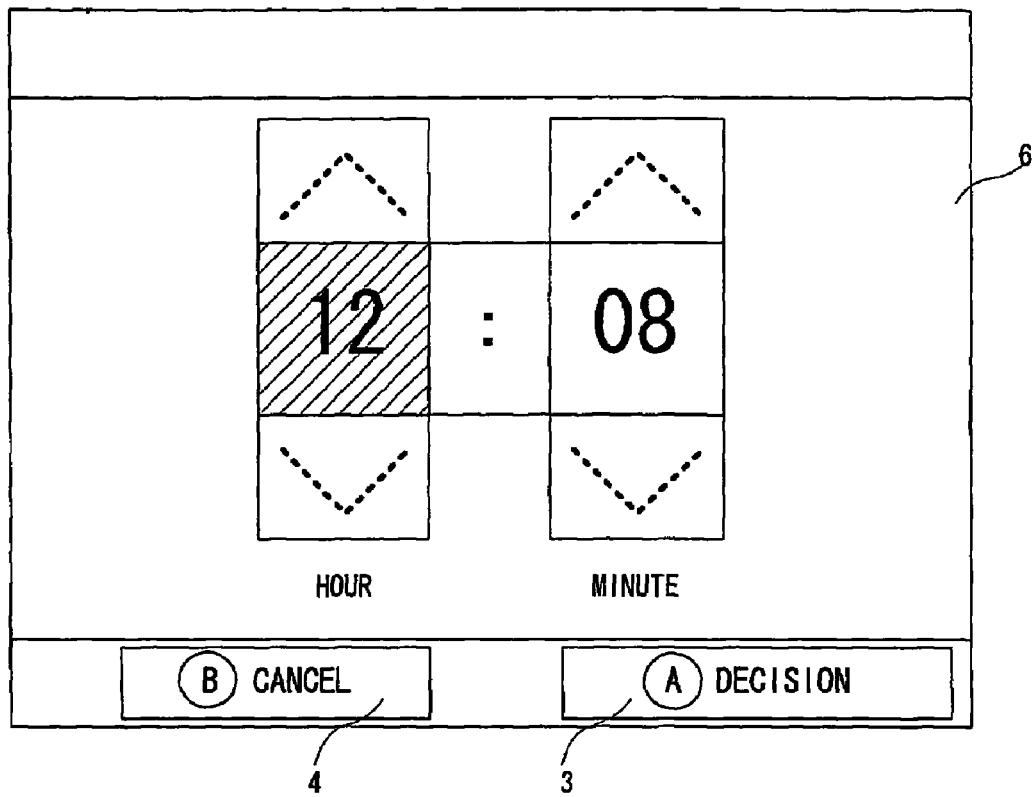
FIG. 3 is an illustrative view showing one example of a time setting screen when a date and time panel is selected on the mode selecting screen in the related art shown in FIG. 1, and a time setting mode is then selected.
Figure 4:
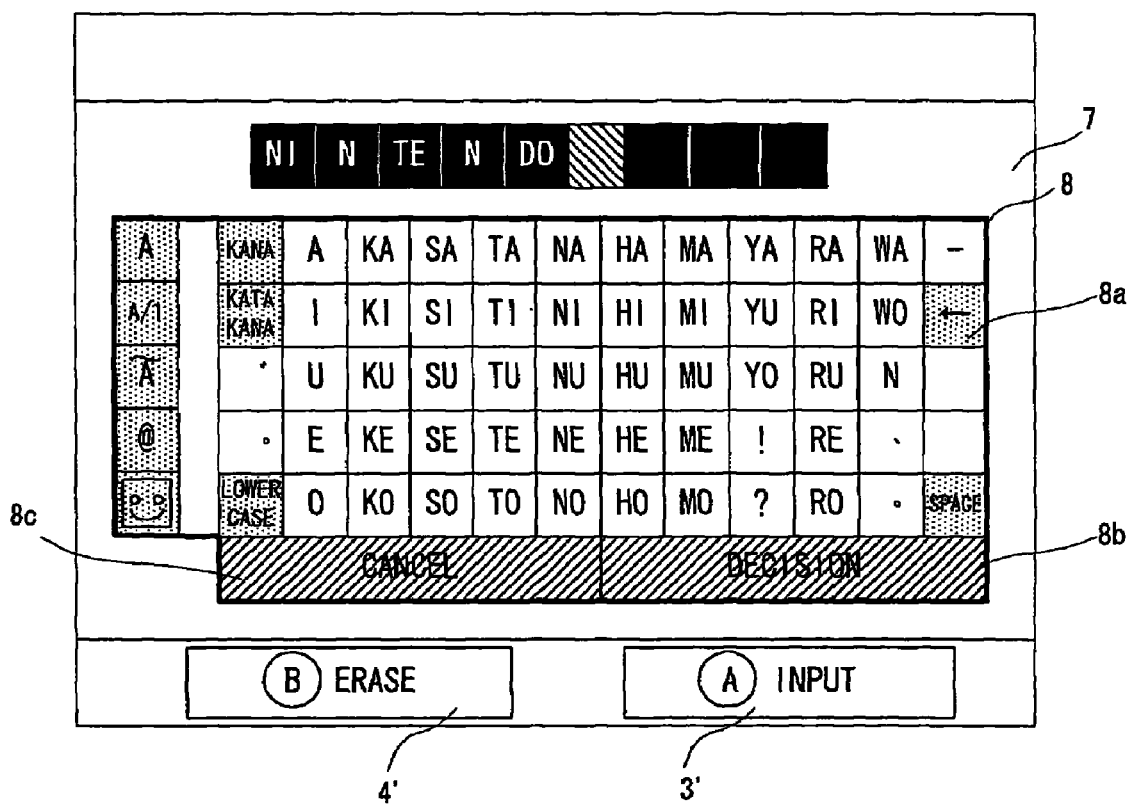
FIG. 4 is an illustrative view showing one example of a user name input screen when a user panel is selected on the mode selecting screen in the related art shown in FIG. 1, and a user name input mode is then selected.

The data memory region 66 further includes a temporary input area 76 for temporarily storing time data, language data, and user name data, an image data area 78 for storing image data for setting and displaying a menu screen (not illustrated), respective software input regions shown in FIG. 1-FIG. 3 and software input regions described later and shown in FIG. 9(A) and FIG. 9(B) on the display device 12 and/or 14, and displaying a game image, and a data area 80 for temporarily storing cursor position data indicating a cursor position and a touch position data indicating a touched position on the touch panel 24.

Figure 1:
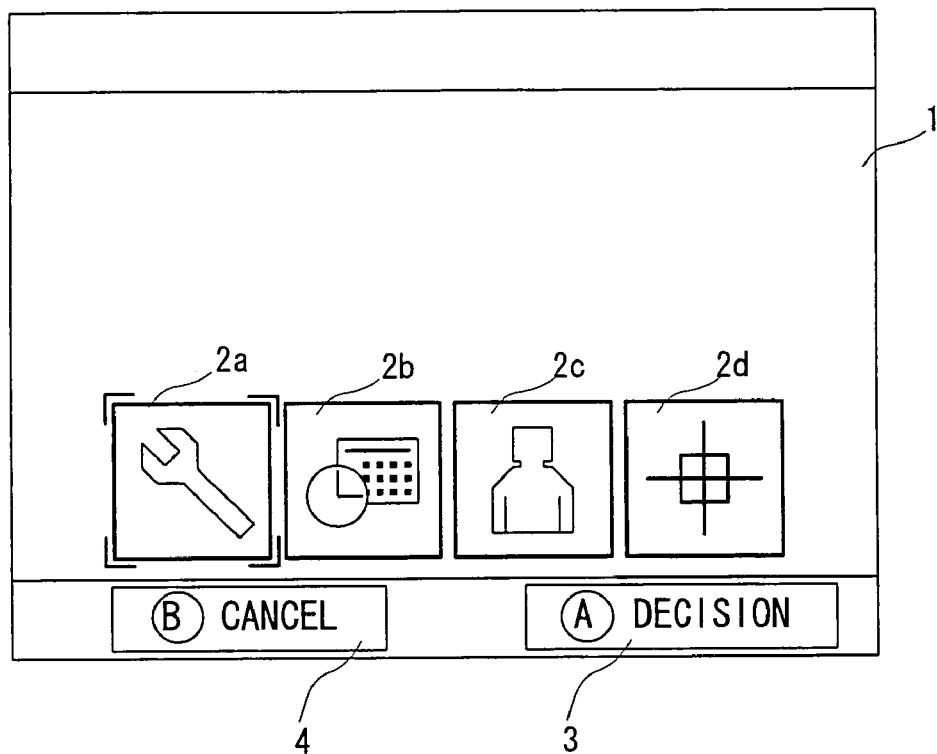
FIG. 1 is an illustrative view showing one example of a mode selecting screen in the related art of the present invention.
Figure 8:
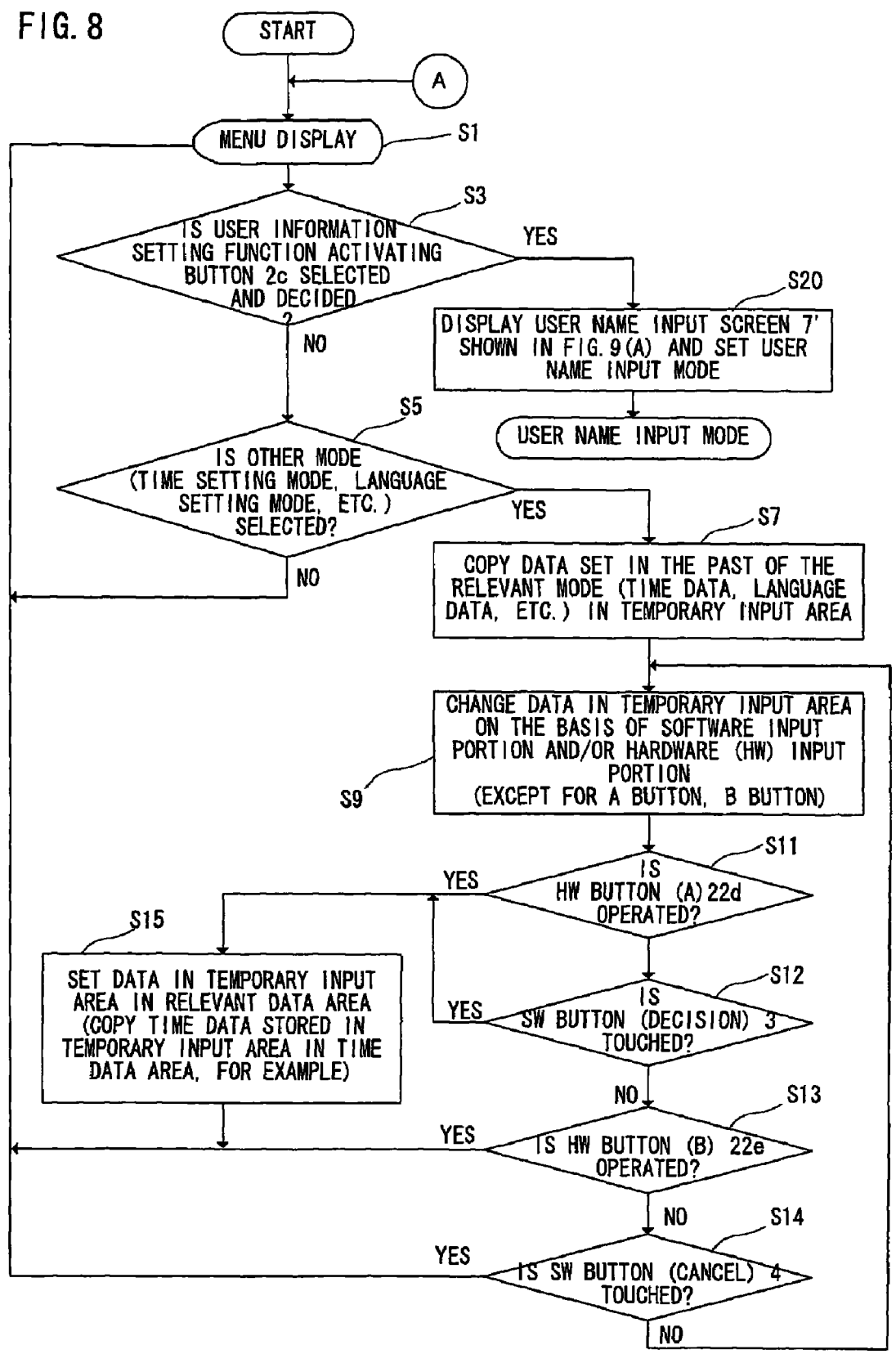
FIG. 8 is a flowchart showing an initial operation in FIG. 5 embodiment.

In a step SI shown in FIG. 8, image data for menu display is read from the image data area 78 (FIG. 7) by means of the menu display program 62 shown in FIG. 7 to display a mode selecting software input region 1 as shown in FIG. 1, for example. Then, in a next step S3, in the mode selecting software input region 1 in FIG. 1, the computer determines whether or not the user information setting function activating button 2c (FIG. 1) is selected by moving a cursor (not illustrated) by use of an operation of the HW button (cross) 22a by the user or by a touch of the area of the activating button 2c of the information setting function (user name input mode) on the touch panel 24 (FIG. 5, 6), and then determines whether or not the SW button (decision) 3 is touched, or the HW button (A) 22d is operated. If the determination in the step S3 is "NO", the process proceeds to a next step S5 to determine whether or not other mode, a time setting mode, a language setting mode or the like is selected. That is, it is determined whether or not the SW buttons 2a, 2b or 2d shown in FIG. 1 is selected, and then whether or not the SW button (decision) 3 is touched or the HW button (A) 22d is operated. If "NO" is determined in the step S5, the process returns to the preceding step S1 to wait for a next user instruction.

If "YES" is determined in the step S5, the computer reads data set in the past, such as time data, language data or the like of the relevant mode, such as a time setting mode, a language setting mode, or the like from the time data registering area 70, the language data registering area 72 or the like, and copies it in the temporary input area 76 in a next step S7. Then, in a following step S9, the computer changes the data in the above-described temporary input area 76 on the basis of a touch panel input and/or an operation input of the HW button (except for A, B) by the user. Here, since the setting method in the time setting mode and the language setting mode is similar to that explained in the [related art] before, a further explanation is omitted. The changing process in the step S9 is repetitively executed until "YES" is determined in step S11, S12, S13 or S14, that is, until an operation of the HW button (A) 22d is detected, until an operation of the SW button (decision) 3 is detected, until an operation of the HW button (B) 22e is detected, or until an operation of the SW button (cancel) 4 is detected.

In the step S12 shown in FIG. 8, when an operation of the SW button (decision) 3 is detected, just as the operation of the HW button (A) 22d is detected in the step S11, the computer sets the data in the temporary input area 76 in the relevant data area, that is, the time data registering area 70 and the language data registering area 72 in a step S15. For example, the computer registers time data and language data stored in the temporary input area 76 in the time data area 70 and the language data area 72 to thereby set a time and a language. By the step S15, the change of the registration of the time data and the language data changed by the user is completed. Then, the process returns to the preceding step S1 to wait for a next user instruction.

Furthermore, when an operation of the HW button (B) 22e is detected in the step S13, or when an operation of the SW button (cancel) 4 is detected in the step S14, the process returns to the step S1. That is, cancel processing is executed, and the process returns to the just before mode, a menu display state in this case, to wait for an instruction from the user.

Figure 10:
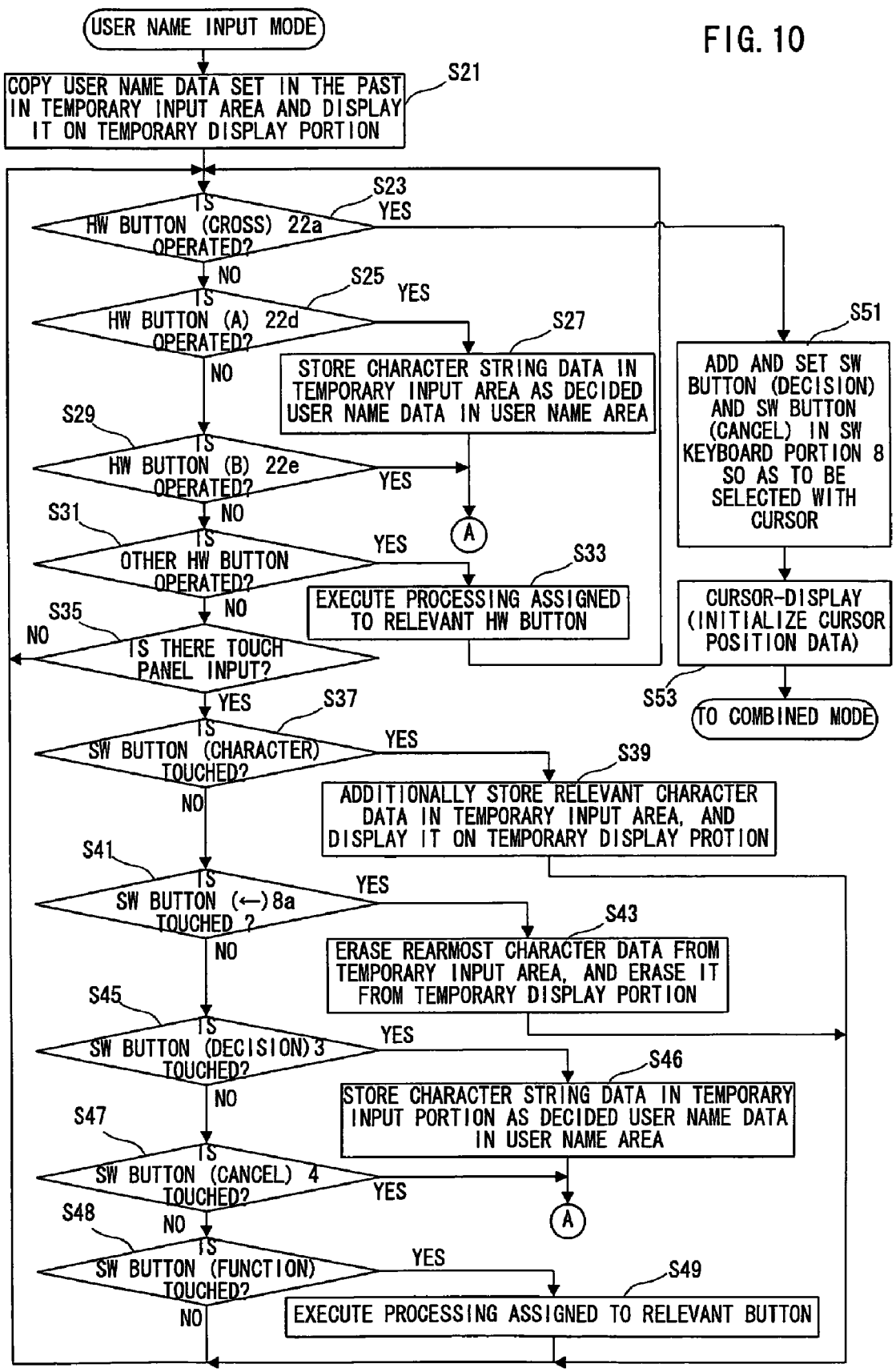
FIG. 10 is a flowchart showing an operation of the user name input mode in FIG. 5 embodiment.

When "YES" is determined in the preceding step S3, that is, when the activating button 2c of the user information setting function (user name input mode) is selected in a state that the mode selecting software input region 1 is set (displayed) on the displaying portion, a software input region 7' shown in FIG. 9(A) is set on the display device 14 (FIG. 5) in a step S20, and the process proceeds to a user name input mode shown in FIG. 10. That is, the user selects the user name input mode by touching the user information setting function activating button 2c (icon) on the mode selecting software input region 1 shown in FIG. 1, or selecting with a cursor the user information setting function activating button 2c by the HW button (cross), and then decides the selection of the SW button 2c by operating the HW button (A) 22d or touching the SW button (decision) 3. At that step, the computer reads and processes a software keyboard area image and portion setting data from the image data area 78 (FIG. 7) according to the user name input program 64 (FIG. 7) to thereby set and display a mode selecting software input region 1 shown in FIG. 9(A) on the displaying portion. The mode selecting software input region 1 at this time further includes a software keyboard area 8' surrounded by a boldface box in FIG. 9(A). The software keyboard area 8' includes an area ("a" (in Japanese hiragana) button, etc.; hereinafter called a SW button (character)) for inputting characters and symbols, an area for executing a function ("←: backspace" button, a switching button for switching between a kana input and an alphabetic input (hereinafter called SW button (function)); shown by "shading" in FIG. 9(A)), etc. That is, in the software keyboard area 8' in FIG. 9(A), the SW button without shading results in the SW button (character). It should be noted in advance that the user name inputting software input region 7' shown in FIG. 9(A) is slightly different from the user name inputting software input region 7 shown in the related art in FIG. 4.

Thereafter, the process proceeds to FIG. 10.

In FIG. 9(A) and FIG. 9(B), a temporary display portion 82 is also illustrated together with the above. The temporary display portion 82 is an area for allowing the user to visually check the character that the user inputs at that time when the user makes a character input by directly touching the software keyboard area 8' shown in FIG. 9(A), or by selecting with a cursor any one of the SW buttons (character) included in the software keyboard area 8' by the HW button (cross) 22a and then operating the HW button (A) 22d (in a case of the combined mode).

In a first step S21 in FIG. 10, the computer reads the user name data registered before from the user name data registering area 74, copies it in the temporary input area 76, displays it at the temporary display portion 82 on the LCD 12 or 14, and waits for a successive user input. Here, when the user name is not registered before, since no data is registered in the user name data registering area 74 (null data is stored in the user name data registering area 74 in an initial state), no data is copied in the temporary input area 76, and no data is displayed at the temporary display portion.

Then, in a next step S23, the computer determines whether or not the user operates the HW button (cross) 22a (a direction operation of any one of the left, right, top and bottom is made). If "NO", it is determined whether or not the HW button (A) 22d is operated in a next step S25. The HW button (A) 22d is a decision button as described before, and therefore, if "YES" is determined in the step S25, it is considered that a user name input by the user is ended, and the character string data stored in the temporary input area 76 is stored as user name data as decided data in the user name data registering area 74 (FIG. 7) in a step S27. Then, the user name input mode is ended.

When "NO" is determined in the step 25, that is, when the HW button (A) 22d has not been operated yet, the computer determines whether or not the HW button (B) 22e is operated in a step S29. As described before, the HW button (B) 22e functions as a cancel button, and therefore, operating the HW button (B) 22e means that the mode at that time, that is, the user name input mode is canceled. Thus, like after execution of the step S27, cancel processing is made such that the process returns to the first step S1 in FIG. 8 to wait for a next instruction from the user.

In addition, When "NO" is determined in the step 29, the computer determines whether or not any one of other HW buttons 22f, 22g, 22R and 22L is operated in a next step S31. Then, if "YES" is determined in the step S31, the computer executes processing assigned to the HW button (relevant HW button) whose operation is detected in a succeeding step S33.

However, when "NO" is determined in the step S31, the computer determines whether or not there is a touch panel input by detecting the presence or absence of an input from the touch panel 24 to the I/F circuit 48 in a succeeding step S35. If "NO", the process directly returns to the preceding step S23 while if "YES", the computer determines whether or not the area touched by the user at that time is the position of the SW button (character) at the software keyboard area 8' shown in FIG. 9(A) in a next step S37.

When "YES" is determined in the step S37, the computer adds and stores the character data determined on the basis of the touch position on the touch panel stored in the data area 80 (FIG. 7) in the temporary input area 76 (FIG. 7) (that is, added to the last of the data already stored in the temporary input area 76 to be stored), and displayed in the temporary display portion 82 (FIG. 9) in a next step S39. Thereafter, the process returns to the preceding step S23.

When "NO" is determined in the preceding step S37, that is, when it is determined that the touched position at that time is within the range of the software keyboard area 8' (FIG. 9(A)) but out of the portion of the SW buttons (character), the computer determines whether or not the touched position is a portion of the SW button (←) 8a shown in FIG. 9(A) in a step S41. If "YES", in a succeeding step S43, the computer erases the rearmost character data in the character string data temporarily stored in the temporary input area 76, and erases the display of the relevant character from the temporary display portion 82. Thereafter, the process returns to the preceding step S23.

When "NO" is determined in the preceding step S41, that is, when it is determined that the touched position indicated by the data stored in the data area 80 at that time is not the position of the SW button (←) 8*a*, the computer determines whether or not the touched position is the portion of the SW button (decision) 3 shown in FIG. 9(A) in a step S45. If the touched position is the position of the SW button (decision) 3, "YES" is determined in the step S45, and in a succeeding step S46, the computer registers the character string data temporarily stored in the temporary input area 76 as decided user name data in the user name registering area 74. Then, the process returns to the preceding step S1.

Thus, when the SW button (decision) 3 is touched in a state that the user name inputting software input region 7' shown in FIG. 9(A) is set, decision processing is executed just as the HW button (A) 22*d* is operated. Accordingly, by operating the HW button (A) 22*d* in place of the SW button (decision) 3 also, "YES" is determined in the step S25, and whereby, determination processing or decision processing in the step S27 can be executed.

When "NO" is determined in the preceding step S45, that is, when it is determined that the touched position at that time is not the position of the SW key (←) 8*a* or the position of the SW button (decision) 3, the computer determines whether or not the touched position is the portion of the SW button (cancel) 4 as shown in FIG. 9(A) in a step S47. If the touched position is the position of the SW button (cancel) 4, "YES" is determined in the step S47. In this case, the process returns to the first step S1 shown in FIG. 8 to wait for a next input from the user.

When "NO" is determined in the step 47, the computer determines whether or not the touched position is other button (except for the SW button (←) 8*a* in the step S41) of the SW button (function) within the software keyboard area 8' in a next step S48. If "YES" is determined in the step S48, the computer performs processing assigned to the relevant SW button (function) in a next step S49, and then, the process returns to the step S23.

Thus, when the SW button (cancel) 4 is touched in a state that the user name inputting software input region 7' as shown in FIG. 9(A) is set, the process returns to the step S1 from the step S47. The step S1 is a first menu displaying step, and means that the user name registering mode which is being selected at that time is canceled, and the process returns to a state in which the first mode selecting software input region 1 is set (FIG. 1). That is, the computer executes cancel processing in response to a touch of the SW button (cancel) 4 just as the operation of the HW button (B) 22*e* is detected in the preceding step S29. Briefly speaking, a touch of the SW button (cancel) 4 and an operation of the HW button (B) 22*e* yields the same result, and in the user name input mode (user information setting function), the processing in response to an operation of the HW button (A) 22*d* or the HW button (B) 22*e* and the processing in response to a touch of the SW button (decision) 3 or the SW button (cancel) 4 are equal to each other, and therefore, uncomfortable feeling never occurs to the operation.

When "YES" is determined in the preceding step S23, the computer moves (additionally set) the SW button (decision) and the SW button (cancel) to the software keyboard area 8' such that the SW button (decision) and the SW button (cancel) which are determined to be touched in the steps S45 and S47 can be selected with the cursor (not illustrated) in a next step S51. More specifically, the computer processes the image data and the area data stored in the image data area 78 according to the user name input program 64 to thereby set and display the software keyboard area 8 including the SW button (decision) and the SW button (cancel) as shown in FIG. 9(B). It should be noted that the software keyboard area 8 includes the SW button (decision) and the SW button (cancel) which are added to the software keyboard area 8' and thus may be called an "expanded software keyboard area". Also, in FIG. 9(A), an SW button (input) 3' and an SW button (erase) 4' are displayed at the positions where the SW button (decision) 3 and the SW button (cancel) 4 have been arranged. The arrangement of the expanded software keyboard area 8, the SW button (input) 3' and the SW button (erase) 4' shown in FIG. 9(B) is the same as that of the conventional software keyboard area 8 on the conventional user name input screen 7 shown in FIG. 4. Whenever characters and symbols are input by means of the HW input portion, an operation of "selecting a character key, etc. in the software keyboard area 8' in accordance with a movement of the cursor (not illustrated) by operating the HW button (cross) 22*a*" is necessary. Thus, in this embodiment, an operation of the HW button (cross) 22*a* after displaying the software keyboard area 8' is regarded as a user's intention to input a character by utilizing both of the HW input portion 22 and the touch panel, and therefore, a user interface for a character input is switched from the software keyboard area 8' (FIG. 9(A)) to the expanded software keyboard area 8 (FIG. 9(B)) before and after the operation of the HW button (cross) 22*a*. This makes it possible to unify the sense in operation in the user interface of other scenes (time setting mode and language setting mode, etc.). However, in this case, since only the character input with the expanded software keyboard area 8 by operating the HW input portion 22 is restricted, for use of the touch panel, the user can make an input as it is without uncomfortable feeling as described in the preceding step S37 and S39. That is, the change of the function as to the software keyboard area 8' and 8, and their attendant change in the hardware input portion are based on the user's intention, so that the user does not have uncomfortable feeling when operating the input area and portion.

It is needless to say that even after "YES" is determined in the step S23, a data input may be made not by the combined use of the HW input portion and the software input area (touch panel) but by only the HW input portion.

It should be noted that after the user interface, that is, the software keyboard area 8' shown in FIG. 9(A) is switched to the software keyboard area 8 shown in FIG. 9(B) in a step S51, the computer displays the cursor at the initial position in a step S53. More specifically, by setting the cursor position data set to the data area 80 (FIG. 7) of the RAM 42 to an initial value, it is possible to display the cursor at the initial position (that is, after activation of the user name input processing, the cursor is displayed for the first time in the step S53). After the step S53, the process shifts to a mode capable of making a character input via the expanded software keyboard area 8 by means of the HW input portion 22 (this mode can allow a character input by either of the touch panel (software input region) and the HW input portion, thus may be called "combined mode" for the sake of convenience). The detail of the character input in this combined mode is illustrated in FIG. 11.

Figure 11:
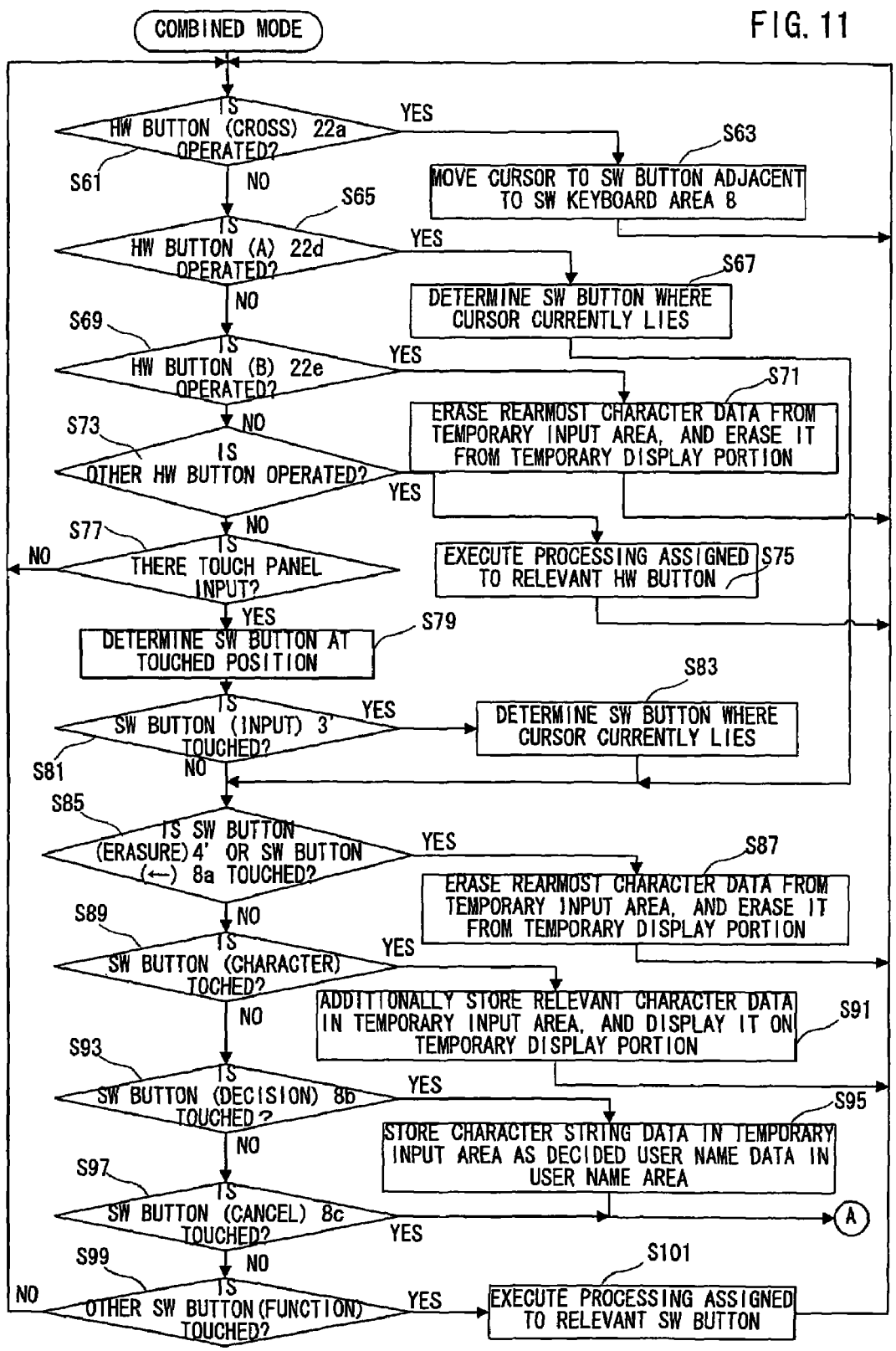
FIG. 11 is a flowchart showing an operation of a combined mode in the user name input mode.

In a first step S61 shown in FIG. 11 of the combined mode, the computer determines whether or not the HW button (cross) 22*a* is operated on the basis of an operation signal of the HW input portion 22 from the I/F circuit 48 (FIG. 6). Then, when "YES" is determined in the step S61, the computer moves the cursor to a key adjacent to the expanded software keyboard area 8 in a succeeding step S63. That is, the computer changes the cursor position data set in the RAM 42, and displays the cursor at the changed position. Then, the process returns to the step S61 again to wait for a next instruction from the user.

When "NO" is determined in the step 61, the computer determines whether or not the HW button (A) 22*d* is operated on the basis of a signal from the I/F circuit 48 in a next step S65. If "YES" is determined, the computer determines the portion of the SW button of the expanded software keyboard area 8 where the cursor currently lies, that is, the portion of the SW button where the cursor is selecting referring to the cursor position data in the data area 80 in a succeeding step S67. That is, since the software input region 7 shown in FIG. 9(B) is set (displayed) on the LCD 14 as "combined mode" at this time, the meaning or function of the HW button (A) 22*d* is changed to "character input". Accordingly, after "YES" is determined in the step S65, it is determined what is the SW button indicated by the cursor position in a step S67, and the process directly proceeds to a step S85.

If "NO" is determined in the step S65, the computer determines whether or not the HW button (B) 22*e* is operated in a next step S69. If "YES" is determined in the step S69, the computer erases the rearmost character data of the character string data temporarily stored in the temporary input area 76, and erases the display of the relevant character from the temporary display portion 82 (no processing is performed when no data is stored in the temporary input area 76) in a step S71. Then, the process returns to the preceding step S61 to wait for a next input.

If "NO" is also determined in the step S69, the computer determines whether or not other HW button is operated in a next step S73. If "YES", the computer executes the processing assigned to the relevant HW button in a step S75, and the process returns to the step S61.

When "NO" is determined in the step 73, that is, when the user operation is not an operation by the HW button, the computer determines whether or not there is an input from the touch panel on the basis of a signal from the I/F circuit 48 (FIG. 6) in a next step S77. If "NO", the process returns to the preceding step S61 to wait for a next input. If "YES" is determined, the computer determines the (relevant) SW button 3', 4' or the SW button of the expanded software keyboard area 8 existing in the position on the touch panel where the user currently touches, that is, the position indicated by the touch position data stored in the data area 80 in FIG. 7 in a next step S79.

Then, in a next step S81, the computer determines whether or not the SW button indicated by the touched position in the step S79 is the SW button (input) 3'. If "YES", the user intends to make any character data input by using the software input region 7 (FIG. 9(B)) at that time, and the computer determines what is the SW button instructed by the cursor position referring to the cursor position at that time stored in the data area 80 in a next step S83 similar to the preceding step S67, and the process proceeds to the step S85.

After "NO" is determined in the step S81, or after the SW button indicated by the cursor position is determined in the step S67 or S83, the computer determines whether or not the SW button touched at that time is the SW button (erase) 4' within the software input region 7 shown in FIG. 9(B) or the SW button (←) 8*a* within the software keyboard area 8 in the step S85. When "YES" is determined in the step S85, the computer erases the last character data in the character string data temporarily stored in the temporary input area 76 (FIG. 7), and erases the display of the relevant character from the temporary display portion 82 (FIG. 9). Then, the process returns to the preceding step S61.

In other words, since the software input region 7 shown in FIG. 9(B) is set (displayed) on the LCD 14 as "combined mode" at this time, the meaning or the function of the SW button (erase) 4' and the SW button (←) 8*a* is equal. Accordingly, when it is determined any one of them is operated in the step S85, "character erase" processing is executed in a step S87.

When "NO" is determined in the step 85, the computer determines whether or not the SW button determined in the preceding step S67 or S83 is the SW button (character) within the expanded software keyboard area 8 in the next step S87. If "YES", the computer adds the character data corresponding to the SW button (character) to the temporary input area 76 to be stored, and displays it on the temporary display portion 82 in a next step S91. Then, the process proceeds to the preceding step S61.

When "NO" is determined in the preceding step S89, that is, when it is determined the touched position at that time is not the position of the SW button (character) (SW button without "shading" within the software keyboard area 8 shown in FIG. 9(B)), the computer determines whether or not the SW button determined in the preceding step S67 or S83 is the SW button (decision) 8*b* of the expanded software keyboard area 8 shown in FIG. 9(B) in a step S93. If the SW button (decision) 8*b*, "YES" is determined in the step S93, and in a succeeding step S95, the computer registers the character string data temporarily stored in the temporary input area 76 as decided user name data in the user name registering area 74. Then, in this case, the process returns to the first step S1 shown in FIG. 8 to wait for a next input by the user.

Thus, in the combined mode, when the SW button (decision) 8*b* of the expanded software keyboard area 8 is touched, when the HW button (A) 22*d* is operated after the SW button (decision) 8*b* is selected with the cursor by the HW button (cross) 22*a*, or when the SW button (input) 3' is touched after the SW button (decision) 8*b* is selected with the cursor by the HW button (cross) 22*a*, decision processing is executed. However, it may be possible that a decision processing is not executed "when the SW button (input) 3' is touched after the SW button (decision) 8*b* is selected with the cursor by the HW button (cross) 22*a*.

When "NO" is determined in the preceding step S93, the computer determines whether or not the SW button determined in the preceding step S67 or S83 is the SW button (cancel) 8*c* in a step S97. When "NO" is determined in the step 97, the process proceeds to a next step S99. If the SW button determined in the step S67 or S83 is the position of the SW button (cancel) 8*c*, "YES" is determined in the step S97. In this case, the process returns to the first step S1 shown in FIG. 8 to wait for a next input by the user.

In the combined mode, when the SW button (cancel) 8*c* of the expanded software keyboard area 8 is touched, when the HW button (A) 22*d* is operated after the SW button (cancel) 8*c* of the HW button (cross) 22*a* is selected with the cursor, or when the SW button (input) 3' is touched after the SW button (cancel) 8*c* is selected with the cursor by the HW button (cross) 22*a*, the process returns from the step S93 to the step S1. The step S1 is a first menu displaying step, and means that the user name registering mode which is being selected at that time is canceled, and returns to the first menu screen. That is, the computer executes cancel processing in response to the touch of the SW key (cancel) 8*c* of the expanded software keyboard area 8 in the combined mode. However, it may be possible that "when the SW button (input) 3' is touched after the SW button (cancel) 8*c* is selected with the cursor by the HW button (cross) 22a", the process does not return to the step S1 (that is, the cancel processing is not executed).

If "NO" is determined in the preceding step S97, the computer determines whether or not the SW button determined in the S67 or S83 is other SW button (except for the character, decision, cancel button) of the expanded software keyboard area 8 in the next step S99. If "YES", the processing assigned to the SW button determined in the S67 or S83 (processing of switching the SW button of the software keyboard area from "KANA" to "alphabetic characters", for example) is executed in a step S101. If "NO", the process returns to the preceding step S61.

In the above-described embodiment, when an operation of the HW button (cross) 22a is detected in the step S23, the software keyboard area is changed such that the SW button (decision or cancel) is moved into the software keyboard area so as to be selected with the cursor. The reason is that an operation of the HW button (cross) 22a at the first software input region 7 by the user in the user name input mode in FIG. 9(A) is regarded as an intention of the user to input a user name in the combined mode. However, the HW button determined in the step S23 may be other HW button, such as the HW button (L) 22L, the HW button (R) 22R, etc., and may be replaced with the SW key and the SW button of the software keyboard area without being restricted to the button of the HW input portion.

In the above-described embodiment, it goes without saying that a touch panel is used as a coordinate input means, but this may be replaced with operating means such as a mouse and other components.

In the above-described embodiment, the processing of inputting input data such as characters, symbols in the user name input mode is illustrated and explained as data input processing. However, the data to be input is not restricted to the user name, and other arbitrary character data, symbol data, etc. may be considered. For example, this may be applied to data input during producing an e-mail message. Furthermore, without being restricted to the character input, the invention may be applied to any input processing of accumulatively inputting predetermined data, then deciding the accumulated input data.

In the explanation of the above-described embodiment, the user name inputting software input region includes the software keyboard area or the expanded software keyboard area and other SW button (decision or input button and cancel or erase button). However, it should be noted that the word "software keyboard area" or "expanded software keyboard area" means a range where the SW button can be selected with the cursor by the HW button (cross) 22a.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising:
   a storing portion,
   a displaying portion,
   a coordinate inputting portion for inputting coordinates to said displaying portion,
   a direction inputting portion, and
   an executing unit for executing data input processing to cause a user to input predetermined data, wherein said executing unit includes:
      a software input region setting unit for setting on said displaying portion a software input region having a plurality of input portions by which a plurality of input data being different from each other can be input,
      a first memory controlling unit for accumulatively storing in said storing portion input data corresponding to said input area specified by the input coordinates by detecting an input via said coordinate inputting portion,
      a deciding unit for deciding the input data accumulatively stored in said storing portion as said predetermined data by detecting a first operation by the user,
      a designating unit for designating any one of said plurality of input areas of said software input region by detecting a direction instructing operation by said direction inputting portion,
      a detecting unit for detecting a second operation by the user, and
      a second memory controlling unit for accumulatively storing the input data corresponding to the input area currently designated by said designating unit out of said plurality of input areas of said software input region by detecting said first operation after a detection by said detecting unit.

2. The information processing apparatus according to claim 1, further comprising a first pushbutton switch, wherein
   said deciding unit decides the input data accumulatively stored in said storing portion as said predetermined data by detecting an operation of said first pushbutton switch as said first operation before a detection of said second operation by said detecting unit, and
   said second memory controlling unit accumulatively stores the input data corresponding to the input area currently designated by said designating unit in said storing portion by detecting the operation of said first pushbutton switch as said first operation after the detection of said second operation by said detecting unit.

3. The information processing apparatus according to claim 1, further comprising a first addition setting unit for setting a first other input area in addition to said software input region on said displaying portion in response to the detection of said second operation, wherein
   said deciding unit decides the input data accumulatively stored in said storing portion as said predetermined data when the input coordinates by said coordinate inputting portion indicates said first other input area instead of said first operation being detected after the detection by said second operation.

4. The information processing apparatus according to claim 3, wherein
   said designating unit designates any one of said plurality of input areas of said software input region and said first other input area by detecting a direction instructing operation by said direction inputting portion, and
   said deciding unit decides the input data accumulatively stored as said predetermined data in a case that said first other input area is designated by said designating unit when said first operation is detected after a detection by said second operation.

5. The information processing apparatus according to claim 1, further comprising
   a first pushbutton switch, and
   a second addition setting unit for setting a second other input area in addition to said software input region on said displaying portion, wherein
   said deciding unit deciding the input data accumulatively stored in said storing portion as said predetermined data when a detection of an operation of said first pushbutton switch and a detection of the input coordinates by said coordinate inputting portion indicating said second other input area are performed as a detection of said first operation before the detection of said second operation, and any one of the detections is then made, and said second memory controlling unit performs accumulatively stores the input data corresponding to said input area currently designated by said designating unit in said storing portion when a detection of an operation of said first pushbutton switch and a detection of the input coordinates by said coordinate inputting portion indicating said second other input area are performed as a detection of said first operation after the detection of said second operation, and any one of the detections is made.

6. The information processing apparatus according to claim 1, further comprising a second pushbutton switch, a first ending unit for ending said data input processing mode in response to a detection of an operation of said second pushbutton switch as a third operation before detecting said second operation, and a first erasing unit for erasing input data last stored out of the input data accumulatively stored in response to the detection of the operation of said second pushbutton switch as the third operation after detecting said second operation.

7. The information processing apparatus according to claim 1, further comprising a third addition setting unit for setting a third other input area in addition to said software input region on said displaying portion in response to the detection of said second operation, wherein said first ending unit ends said data input processing mode when the input coordinates by said coordinate inputting portion indicates said third other input area in stead of a detection of said third operation after the detection of the second operation.

8. The information processing apparatus according to claim 7, wherein said designating unit designates any one of said plurality of input areas and said third other input area of said software input region by detecting a direction instructing operation by said direction inputting portion, and said first ending unit ends said data input processing mode in a case that said third other input area is designated by said designating unit when said first operation is detected after the detection of said second operation.

9. The information processing apparatus according to claim 1, further comprising a second pushbutton switch, a fourth addition setting unit for setting a fourth other input area in addition to said software input region on said displaying portion, a second ending unit for ending said data input processing when a detection of an operation of said second pushbutton switch and a detection of the input coordinates by said coordinate inputting portion indicating said fourth other input area are performed as the detection of a third operation before detecting said second operation, and any one of the detections is made, and a second erasing unit for erasing input data last stored out of said input data accumulatively stored when a detection of said second pushbutton switch and a detection of the input coordinates by said coordinate inputting portion indicating said fourth other input area are performed, and any one of the detections is made.

10. The information processing apparatus according to claim 1, wherein said executing unit can perform any one of data input processing selectively activated out of a plurality of data input processing, and further comprising a process selecting unit for causing the user to select data input processing to be executed from said plurality of data input processing, wherein said executing unit activates and executes the data input processing selected by said process selecting unit by detecting said first operation.

11. The information processing apparatus according to claim 10, wherein said executing unit decides said predetermined data by detecting said first operation in said plurality of data input processing.

12. The information processing apparatus according to claim 10, wherein said executing unit ends the data input processing during execution, and activates said process selecting unit by detecting a third operation in said plurality of data input processing.

13. An information processing apparatus comprising:

a storing portion, a displaying portion, a coordinate inputting portion configured to input coordinates to said displaying portion, a pushbutton switch, a direction inputting portion, and an executing unit for executing data input processing to cause a user to input predetermined data, wherein the executing unit includes:

a software input region setting unit for setting on said displaying portion a software input region having a plurality of input areas by which a plurality of input data being different from each other can be input, a first memory controlling unit for accumulatively storing in said storing portion input data corresponding to said input area specified by the input coordinates by detecting an input via said coordinate inputting portion, a first deciding unit for deciding the input data accumulatively stored in said storing portion as predetermined data by detecting an operation of said pushbutton switch, a designating unit for designating any one of said plurality of input areas of said software input region by detecting a direction instructing operation by said direction inputting portion, a second memory controlling unit for accumulatively storing the input data corresponding to said input area designated by said designating unit by detecting an operation of said pushbutton switch after a detection of the second operation by the user, a first addition setting unit for setting a first other input area in addition to said software input region on said displaying portion in response to the detection of said second operation, and a second deciding unit for deciding the input data accumulatively stored in said storing portion as said predetermined data when the input coordinates by said coordinate inputting portion indicates said first other input area.

14. A data input processing method for causing a user to input predetermined data by a computer of an information processing apparatus having a storing portion, a displaying portion, a coordinate inputting portion for inputting coordinates to said displaying portion and a direction inputting portion, the method including:

setting on said displaying portion a software input region having a plurality of input areas by which a plurality of input data being different from each other can be input;

accumulatively storing in said storing portion input data corresponding to the input area specified by said input coordinates in said plurality of input areas of said software input region by detecting an input by said coordinate inputting portion;

deciding the input data accumulatively stored in said storing portion as said predetermined data by detecting a first operation by the user;

designating any one of said plurality of input areas of said software input region by detecting a direction instructing operation by said direction inputting portion, and accumulatively storing input data corresponding to the input area currently designated out of said plurality of input areas of said software input region in said storing portion by detecting a first operation after a second operation by the user.

15. A non-transitory computer-readable storage medium storing a program to cause a computer of an information processing apparatus having a storing portion, a displaying portion, a coordinate inputting portion for inputting coordinates to said displaying portion and a direction inputting portion to execute:

setting on said displaying portion a software input region having a plurality of input areas by which a plurality of input data being different from each other can be input, accumulatively storing in said storing portion input data corresponding to the input area specified by said input coordinates in said plurality of input areas of said software input region by detecting an input by said coordinate inputting portion, deciding the input data accumulatively stored in said storing portion as said predetermined data by detecting a first operation by the user, designating any one of said plurality of input areas of said software input region by detecting a direction instructing operation by said direction inputting portion, and accumulatively storing input data corresponding to the input area currently designated out of said plurality of input areas of said software input region in said storing portion by detecting a first operation after a second operation by the user.

16. A data input processing method for causing a user to input predetermined data by a computer of an information processing apparatus having a storing portion, a displaying portion, a coordinate inputting portion for inputting coordinates to said displaying portion, a pushbutton switch, and a direction inputting portion, the method including:

setting on said displaying portion a software input region having a plurality of input areas by which a plurality of input data being different from each other can be input;

accumulatively storing in said storing portion input data corresponding to said input area specified by the input coordinates by detecting an input via said coordinate inputting portion;

deciding the input data accumulatively stored in said storing portion as predetermined data by detecting an operation of said pushbutton switch;

designating any one of said plurality of input areas of said software input region by detecting a direction instructing operation by said direction inputting portion;

accumulatively storing the input data corresponding to said input area designated by detecting an operation of said pushbutton switch after a detection of the second operation by the user;

setting a first other input area in addition to said software input region on said displaying portion in response to the detection of said second operation, and deciding the input data accumulatively stored in said storing part as said predetermined data when the input coordinates by said coordinate inputting portion indicates said first other input area.

17. An information processing system comprising:
a storing device,
a displaying device,
a coordinate inputting device configured to coordinates to said displaying device,
a direction inputting device,
a processor configured to:
set on said displaying device a software input region having a plurality of input devices by which a plurality of input data being different from each other can be input, accumulatively store in said storing device input data corresponding to said input area specified by the input coordinates by detecting an input via said coordinate inputting device, decide the input data accumulatively stored in said storing device as said predetermined data by detecting a first operation by the user, designate any one of said plurality of input areas of said software input region by detecting a direction instructing operation by said direction inputting device, a detecting device for detecting a second operation by the user, and the processor is further configured to store the input data corresponding to the input area currently designated by said designating device out of said plurality of input areas of said software input region by detecting said first operation after a detection by said detecting device.

18. An information processing system comprising:
a storing device,
a displaying device,
a coordinate inputting device configured to input coordinates to said displaying device,
a pushbutton switch,
a direction inputting device, and
an executing device configured to:
set on said displaying device a software input region having a plurality of input areas by which a plurality of input data being different from each other can be input, accumulatively store in said storing device input data corresponding to said input area specified by the input coordinates by detecting an input via said coordinate inputting device, decide the input data accumulatively stored in said storing device as predetermined data by detecting an operation of said pushbutton switch, designate any one of said plurality of input areas of said software input region by detecting a direction instructing operation by said direction inputting device, accumulatively store the input data corresponding to said input area designated by said designating device by detecting an operation of said pushbutton switch after a detection of the second operation by the user, set a first other input area in addition to said software input region on said displaying device in response to the detection of said second operation, and decide the input data accumulatively stored in said storing device as said predetermined data when the input coordinates by said coordinate inputting device indicates said first other input area.

19. The information processing apparatus according to claim 1, wherein said direction inputting portion is operated using a hardware input portion that inputs the direction instruction operation.

* * * * *